(12) United States Patent
Buban

(10) Patent No.: US 8,803,888 B2
(45) Date of Patent: Aug. 12, 2014

(54) RECOGNITION SYSTEM FOR SHARING INFORMATION

(75) Inventor: Garret J. Buban, Carnation, WA (US)

(73) Assignee: Microsoft Corporation, Redmond, WA (US)

( * ) Notice: Subject to any disclaimer, the term of this patent is extended or adjusted under 35 U.S.C. 154(b) by 675 days.

(21) Appl. No.: 12/792,549

(22) Filed: Jun. 2, 2010

(65) Prior Publication Data

US 2011/0302293 A1     Dec. 8, 2011

(51) Int. Cl.
*G06T 13/00*     (2011.01)
*G06F 3/048*     (2013.01)

(52) U.S. Cl.
USPC ............ 345/473; 715/972; 715/977; 715/861

(58) Field of Classification Search
USPC ............................ 345/473; 715/972, 977, 861
See application file for complete search history.

(56) References Cited

U.S. PATENT DOCUMENTS

| | | |
|---|---|---|
| 4,627,620 A | 12/1986 | Yang |
| 4,630,910 A | 12/1986 | Ross et al. |
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |

(Continued)

FOREIGN PATENT DOCUMENTS

| | | |
|---|---|---|
| CN | 101254344 B | 6/2010 |
| EP | 0583061 A2 | 2/1994 |

(Continued)

OTHER PUBLICATIONS

Chen, "3D Reconstruction of Human Motion and Skeleton from Uncalibrated Monocular Video", The Ninth Asian Conference on Computer Vision (ACCV), Sep. 23-27, 2009, Springer.

(Continued)

*Primary Examiner* — Kee M Tung
*Assistant Examiner* — Haixia Du
(74) *Attorney, Agent, or Firm* — Gregg Wisdom; Glen Johnson; Micky Minhas

(57) ABSTRACT

A system and method for sharing information between users based on recognition of the users and their associated processing devices in a scene. Interactions can be physical, verbal or a combination of physical and verbal gestures. Movements of the user and other users are tracked and interactions detected between them. User processing devices are connected by detecting users within view of a capture device, the capture device detecting motion tracking data for the user, such as a skeletal model. Information sharing may be controlled by the processing devices directly, by an intermediary server, or by a combination of the processing device and an intermediary server.

20 Claims, 18 Drawing Sheets

(56) References Cited

U.S. PATENT DOCUMENTS

| | | | |
|---|---|---|---|
| 5,239,463 | A | 8/1993 | Blair et al. |
| 5,239,464 | A | 8/1993 | Blair et al. |
| 5,288,078 | A | 2/1994 | Capper et al. |
| 5,295,491 | A | 3/1994 | Gevins |
| 5,320,538 | A | 6/1994 | Baum |
| 5,347,306 | A | 9/1994 | Nitta |
| 5,385,519 | A | 1/1995 | Hsu et al. |
| 5,405,152 | A | 4/1995 | Katanics et al. |
| 5,417,210 | A | 5/1995 | Funda et al. |
| 5,423,554 | A | 6/1995 | Davis |
| 5,454,043 | A | 9/1995 | Freeman |
| 5,469,740 | A | 11/1995 | French et al. |
| 5,495,576 | A | 2/1996 | Ritchey |
| 5,516,105 | A | 5/1996 | Eisenbrey et al. |
| 5,524,637 | A | 6/1996 | Erickson et al. |
| 5,534,917 | A | 7/1996 | MacDougall |
| 5,563,988 | A | 10/1996 | Maes et al. |
| 5,577,981 | A | 11/1996 | Jarvik |
| 5,580,249 | A | 12/1996 | Jacobsen et al. |
| 5,594,469 | A | 1/1997 | Freeman et al. |
| 5,597,309 | A | 1/1997 | Riess |
| 5,616,078 | A | 4/1997 | Oh |
| 5,617,312 | A | 4/1997 | Iura et al. |
| 5,638,300 | A | 6/1997 | Johnson |
| 5,641,288 | A | 6/1997 | Zaenglein |
| 5,682,196 | A | 10/1997 | Freeman |
| 5,682,229 | A | 10/1997 | Wangler |
| 5,690,582 | A | 11/1997 | Ulrich et al. |
| 5,703,367 | A | 12/1997 | Hashimoto et al. |
| 5,704,837 | A | 1/1998 | Iwasaki et al. |
| 5,715,834 | A | 2/1998 | Bergamasco et al. |
| 5,875,108 | A | 2/1999 | Hoffberg et al. |
| 5,877,803 | A | 3/1999 | Wee et al. |
| 5,913,727 | A | 6/1999 | Ahdoot |
| 5,933,125 | A | 8/1999 | Fernie |
| 5,980,256 | A | 11/1999 | Carmein |
| 5,989,157 | A | 11/1999 | Walton |
| 5,995,649 | A | 11/1999 | Marugame |
| 6,005,548 | A | 12/1999 | Latypov et al. |
| 6,009,210 | A | 12/1999 | Kang |
| 6,054,991 | A | 4/2000 | Crane et al. |
| 6,066,075 | A | 5/2000 | Poulton |
| 6,072,494 | A | 6/2000 | Nguyen |
| 6,073,489 | A | 6/2000 | French et al. |
| 6,077,201 | A | 6/2000 | Cheng et al. |
| 6,098,458 | A | 8/2000 | French et al. |
| 6,100,896 | A | 8/2000 | Strohecker et al. |
| 6,101,289 | A | 8/2000 | Kellner |
| 6,128,003 | A | 10/2000 | Smith et al. |
| 6,130,677 | A | 10/2000 | Kunz |
| 6,141,463 | A | 10/2000 | Covell et al. |
| 6,147,678 | A | 11/2000 | Kumar et al. |
| 6,152,856 | A | 11/2000 | Studor et al. |
| 6,159,100 | A | 12/2000 | Smith |
| 6,173,066 | B1 | 1/2001 | Peurach et al. |
| 6,181,343 | B1 | 1/2001 | Lyons |
| 6,188,777 | B1 | 2/2001 | Darrell et al. |
| 6,215,890 | B1 | 4/2001 | Matsuo et al. |
| 6,215,898 | B1 | 4/2001 | Woodfill et al. |
| 6,226,396 | B1 | 5/2001 | Marugame |
| 6,229,913 | B1 | 5/2001 | Nayar et al. |
| 6,256,033 | B1 | 7/2001 | Nguyen |
| 6,256,400 | B1 | 7/2001 | Takata et al. |
| 6,283,860 | B1 | 9/2001 | Lyons et al. |
| 6,289,112 | B1 | 9/2001 | Jain et al. |
| 6,299,308 | B1 | 10/2001 | Voronka et al. |
| 6,308,565 | B1 | 10/2001 | French et al. |
| 6,316,934 | B1 | 11/2001 | Amorai-Moriya et al. |
| 6,363,160 | B1 | 3/2002 | Bradski et al. |
| 6,384,819 | B1 | 5/2002 | Hunter |
| 6,411,744 | B1 | 6/2002 | Edwards |
| 6,430,997 | B1 | 8/2002 | French et al. |
| 6,476,834 | B1 | 11/2002 | Doval et al. |
| 6,496,598 | B1 | 12/2002 | Harman |
| 6,503,195 | B1 | 1/2003 | Keller et al. |
| 6,539,931 | B2 | 4/2003 | Trajkovic et al. |
| 6,570,555 | B1 | 5/2003 | Prevost et al. |
| 6,633,294 | B1 | 10/2003 | Rosenthal et al. |
| 6,640,202 | B1 | 10/2003 | Dietz et al. |
| 6,661,918 | B1 | 12/2003 | Gordon et al. |
| 6,674,877 | B1 | 1/2004 | Jojic et al. |
| 6,681,031 | B2 | 1/2004 | Cohen et al. |
| 6,714,665 | B1 | 3/2004 | Hanna et al. |
| 6,731,799 | B1 | 5/2004 | Sun et al. |
| 6,738,066 | B1 | 5/2004 | Nguyen |
| 6,765,726 | B2 | 7/2004 | French et al. |
| 6,788,809 | B1 | 9/2004 | Grzeszczuk et al. |
| 6,801,637 | B2 | 10/2004 | Voronka et al. |
| 6,873,723 | B1 | 3/2005 | Aucsmith et al. |
| 6,876,496 | B2 | 4/2005 | French et al. |
| 6,937,742 | B2 | 8/2005 | Roberts et al. |
| 6,950,534 | B2 | 9/2005 | Cohen et al. |
| 7,003,134 | B1 | 2/2006 | Covell et al. |
| 7,036,094 | B1 | 4/2006 | Cohen et al. |
| 7,038,855 | B2 | 5/2006 | French et al. |
| 7,039,676 | B1 | 5/2006 | Day et al. |
| 7,042,440 | B2 | 5/2006 | Pryor et al. |
| 7,050,606 | B2 | 5/2006 | Paul et al. |
| 7,058,204 | B2 | 6/2006 | Hildreth et al. |
| 7,060,957 | B2 | 6/2006 | Lange et al. |
| 7,113,918 | B1 | 9/2006 | Ahmad et al. |
| 7,121,946 | B2 | 10/2006 | Paul et al. |
| 7,170,492 | B2 | 1/2007 | Bell |
| 7,184,048 | B2 | 2/2007 | Hunter |
| 7,202,898 | B1 | 4/2007 | Braun et al. |
| 7,222,078 | B2 | 5/2007 | Abelow |
| 7,227,526 | B2 | 6/2007 | Hildreth et al. |
| 7,259,747 | B2 | 8/2007 | Bell |
| 7,308,112 | B2 | 12/2007 | Fujimura et al. |
| 7,317,836 | B2 | 1/2008 | Fujimura et al. |
| 7,348,963 | B2 | 3/2008 | Bell |
| 7,359,121 | B2 | 4/2008 | French et al. |
| 7,367,887 | B2 | 5/2008 | Watabe et al. |
| 7,379,563 | B2 | 5/2008 | Shamaie |
| 7,379,566 | B2 | 5/2008 | Hildreth |
| 7,389,591 | B2 | 6/2008 | Jaiswal et al. |
| 7,412,077 | B2 | 8/2008 | Li et al. |
| 7,421,093 | B2 | 9/2008 | Hildreth et al. |
| 7,430,312 | B2 | 9/2008 | Gu |
| 7,436,496 | B2 | 10/2008 | Kawahito |
| 7,450,736 | B2 | 11/2008 | Yang et al. |
| 7,452,275 | B2 | 11/2008 | Kuraishi |
| 7,460,690 | B2 | 12/2008 | Cohen et al. |
| 7,489,812 | B2 | 2/2009 | Fox et al. |
| 7,536,032 | B2 | 5/2009 | Bell |
| 7,555,142 | B2 | 6/2009 | Hildreth et al. |
| 7,560,701 | B2 | 7/2009 | Oggier et al. |
| 7,570,805 | B2 | 8/2009 | Gu |
| 7,574,020 | B2 | 8/2009 | Shamaie |
| 7,576,727 | B2 | 8/2009 | Bell |
| 7,590,262 | B2 | 9/2009 | Fujimura et al. |
| 7,593,552 | B2 | 9/2009 | Higaki et al. |
| 7,598,942 | B2 | 10/2009 | Underkoffler et al. |
| 7,607,509 | B2 | 10/2009 | Schmiz et al. |
| 7,620,202 | B2 | 11/2009 | Fujimura et al. |
| 7,668,340 | B2 | 2/2010 | Cohen et al. |
| 7,680,298 | B2 | 3/2010 | Roberts et al. |
| 7,683,954 | B2 | 3/2010 | Ichikawa et al. |
| 7,684,592 | B2 | 3/2010 | Paul et al. |
| 7,701,439 | B2 | 4/2010 | Hillis et al. |
| 7,702,130 | B2 | 4/2010 | Im et al. |
| 7,704,135 | B2 | 4/2010 | Harrison, Jr. |
| 7,710,391 | B2 | 5/2010 | Bell et al. |
| 7,729,530 | B2 | 6/2010 | Antonov et al. |
| 7,746,345 | B2 | 6/2010 | Hunter |
| 7,760,182 | B2 | 7/2010 | Ahmad et al. |
| 7,809,167 | B2 | 10/2010 | Bell |
| 7,834,846 | B1 | 11/2010 | Bell |
| 7,852,262 | B2 | 12/2010 | Namineni et al. |
| RE42,256 | E | 3/2011 | Edwards |
| 7,898,522 | B2 | 3/2011 | Hildreth et al. |
| 8,035,612 | B2 | 10/2011 | Bell et al. |
| 8,035,614 | B2 | 10/2011 | Bell et al. |
| 8,035,624 | B2 | 10/2011 | Bell et al. |

(56) References Cited

U.S. PATENT DOCUMENTS

| | | | |
|---|---|---|---|
| 8,072,470 | B2 | 12/2011 | Marks |
| 2003/0035001 | A1 | 2/2003 | Van Geest et al. |
| 2008/0026838 | A1 | 1/2008 | Dunstan et al. |
| 2008/0037829 | A1 | 2/2008 | Givon |
| 2008/0152191 | A1 | 6/2008 | Fujimura et al. |
| 2009/0113313 | A1* | 4/2009 | Abernethy et al. ........... 715/757 |
| 2009/0141933 | A1 | 6/2009 | Wagg |
| 2009/0221368 | A1 | 9/2009 | Yen et al. |
| 2010/0026780 | A1 | 2/2010 | Tico et al. |
| 2010/0033484 | A1 | 2/2010 | Kim et al. |
| 2010/0267448 | A1* | 10/2010 | Snoddy et al. .................. 463/30 |
| 2010/0325206 | A1* | 12/2010 | Dayal et al. .................... 709/204 |

FOREIGN PATENT DOCUMENTS

| | | | |
|---|---|---|---|
| JP | 08044490 | A1 | 2/1996 |
| WO | 93/10708 | A1 | 6/1993 |
| WO | 97/17598 | A1 | 5/1997 |
| WO | 99/44698 | A1 | 9/1999 |
| WO | WO2009059065 | | 5/2009 |

OTHER PUBLICATIONS

Steen, "Microsoft: Natal will adapt sensors to your room", CNET News, Natal Posts-Gaming and Culture, Mar. 24, 2010, http://news.cnet.com/gaming-and-culture/?keyword=Natal.

Sundar, "Skeleton Based Shape Matching and Retrieval", Proceedings of the Shape Modeling International, May 12-15, 2003, p. 130 IEEE Computer Society, Washington, DC, USA.

Oliver, "Sony Motion Controller vs. Natal", Windows 7 Themes, blog site, Feb. 28, 2010, 9 pages, http://windows7themes.net/sony-motion-controller-vs-natal.html.

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shag et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "CONDENSATION—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collision of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

English Machine-translation of Japanese Publication No. JP08-044490 published on Feb. 16, 1996.

Shivappa, et al., "Person Tracking With Audio-visual Cues Using the Iterative Decoding Framework," IEEE 5th International Conference on Advanced Video and Signal Based Surveillance, 2008, pp. 260-267.

Toyama, et al., "Probabilistic Tracking in a Metric Space," Eighth International Conference on Computer Vision, Vancouver, Canada, vol. 2, Jul. 2001, 8 pages.

Office Action dated May 6, 2013, in Chinese Patent Appl. No. 201110159087.3 filed Jun. 1, 2011.

Amendment dated May 31, 2013, in Chinese Patent Appl. No. 201110159087.3 filed Jun. 1, 2011.

Office Action dated Aug. 8, 2013, in Chinese Patent Appl. No. 201110159087.3 filed Jun. 1, 2011.

Amendment dated Aug. 28, 2013, in Chinese Patent Appl. No. 201110159087.3 filed Jun. 1, 2011.

Office Action dated Sep. 30, 2013, in Chinese Patent Appl. No. 201110159087.3 filed Jun. 1, 2011.

* cited by examiner

RECOGNITION SYSTEM FOR SHARING INFORMATION

BACKGROUND

Numerous systems exist which allow users to share information. Often, information sharing is somewhat cumbersome and not based on natural interactions between users. Information sharing is generally not tied to a physical location. Sharing data from one computer to another typically involves the user with the data configuring a computer in some way to be a server or provide information to a shared environment, and the other user configuring their computer to connect to that server or shared environment. This can be a complicated and/or time consuming process. Users often find it easier to simply e-mail data, since the client/server relationships have already been established.

Similarly, exchanging contact information, such as an e-mail address, is typically a manual processes, though at least one application exists for proximity sharing between devices. The bump™ application allows mobile phone users to share information when they "bump" their phones together.

SUMMARY

The technology, roughly described, is a system and method for recognition of users and sharing of information between such users. The technology allows users having associated processing devices to share information with other users within view of the system based on natural interactions between the users. Interactions can be physical, verbal or a combination of physical and verbal interactions. User processing devices are connected by detecting users within view of a capture device motion tracking data for the user, such as a skeletal model. Movements of the user and other users are tracked and interactions detected between them. When an interaction occurs, the interaction may trigger information sharing between the processing devices. Information sharing may be controlled by the processing devices directly, by an intermediary server, or by a combination of the processing device and an intermediary server.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The features described in this summary and the following detailed description are not all-inclusive, and particularly, many additional features and advantages will be apparent to one of ordinary skill in the art in view of the drawings, specification, and claims hereof.

BRIEF DESCRIPTION OF THE DRAWINGS

The systems, methods, and computer readable storage media for limiting gesture display of an avatar in accordance with this specification are further described with reference to the accompanying drawings in which.

DETAILED DESCRIPTION

Technology is presented for a recognition and sharing system allowing users having a processing device to share information with other users within view of the system based on natural interactions between the users. Interactions can be physical, verbal or a combination of physical and verbal interactions. When a user enters the view of the system the user's processing device detects the system and associates motion tracking data for the user, such as a skeletal model, with the user. The system tracks movements of the user with other users who have processing devices registered with the system and detects interactions between them. When an interaction occurs, the interaction may trigger information sharing between the processing devices. Information sharing may be controlled by the processing devices directly, by an intermediary server, or by a combination of the processing device and an intermediary server.

Figure 1:
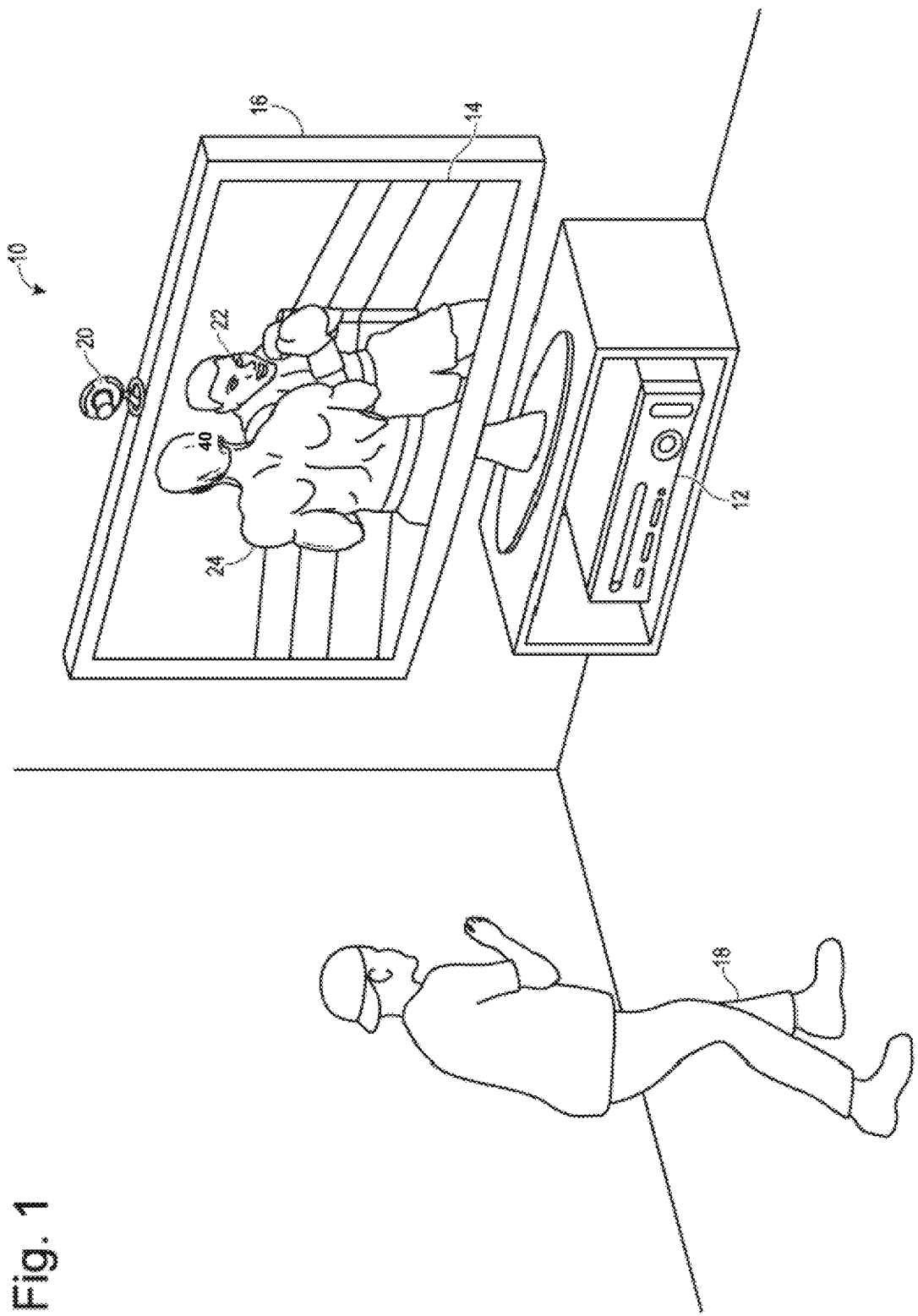
FIG. 1 illustrates an exemplary embodiment of a target recognition, analysis, and tracking system with a user playing a game.

FIG. 1 illustrates a user interacting with an example embodiment of a target recognition, analysis, and tracking system 10 which recognizes human beings in their natural environment, without special sensing devices attached to the subjects, uniquely identifies them and tracks them in three dimensional space. However, the technology can be applicable to other avatar control mechanisms such as a sensor based system in which a user wears sensors or avatar control systems based on devices, some examples of which are keyboards, a mouse, trackball, game pad, or joystick.

According to the example embodiment, the target may be a human target (e.g. user 18), a human target with an object, two or more human targets, or the like that may be scanned to generate a model such as a skeletal model, a mesh human model, or any other suitable representation thereof. The model may be tracked such that physical movements or motions of the target may act as a real-time user interface that adjusts and/or controls parameters of an application such as an electronic game. Furthermore, the model can be presented to applications as a model and delivered to them in real-time. For example, the tracked motions of a user may be used to move an on-screen character or avatar in an electronic role-playing game.

In one example in which the model is a multi-point skeletal model, target recognition, analysis, and tracking system 10 efficiently tracks humans and their natural movements by understanding the natural mechanics and capabilities of the human muscular-skeletal system. The example system 50 also uniquely recognizes individuals in order to allow multiple people to interact with the system via natural movements of their limbs and body.

Specifically, FIG. 1 illustrates an example embodiment of a configuration of a target recognition, analysis, and tracking system 10 with a user 18 playing a boxing game. As discussed below, software executing on a computer system 12 which controls or interacts with software on other computer systems of the communicatively coupled capture device 20 and audio-visual display unit 16 tracks the movements of user 18, analyzes them, and maps the movements to the user's avatar. Thus, in this example, the user 18 may move his body to control his avatar 24 on the display screen 14 in the boxing game against his opponent avatar 22.

A gesture comprises a motion or pose. The gesture can be performed by an avatar or by a user. Through moving his body, a user may create gestures. For example, a user may be captured in image data. An identified gesture of the user can be parsed for meaning as a control for an application or action to be performed. For example, the user 18 throws a jab in the boxing game of FIG. 1. The game application represents it in the boxing match, determines whether it makes contact on avatar 62 and increases the user's score if it does. A gesture can also be a motion or pose that is a meaningful expression. For example, it can express emotion or a thought or meaning. A gesture may be a static pose, such as holding one's crossed forearms in front of his torso or it may be one or more movements. Furthermore, a gesture may comprise more than one body part, such as clapping the hands together.

For example, the target recognition, analysis, and tracking system 10 may be used to recognize and analyze the punch of the user 18 in a capture area (e.g. the portion of his living room in the field of view of image capture system 200) such that the punch may be interpreted as a gesture, in this case a game control of a punch for his player avatar 24 to perform in game space. Other gestures by the user 18 may also be interpreted as other controls or actions, such as controls to bob, weave, shuffle, block, jab, or throw a variety of different power punches. In the context of the present application, the gestures may comprise interactions between the users.

In other example embodiments, the human target such as the user 18 may have an object. A gesture may also incorporate props. In such embodiments, the user of an electronic game may be holding and using the object while participating in the game. In the context of the present technology, a target recognition, analysis, and tracking system may track a user in a scene relative to a user's processing device, as discussed below. Target recognition and analysis technology is described in U.S. patent application Ser. No. U.S. patent application Ser. No. 12/475094, issued on Feb. 19, 2013 as U.S. Pat. No. 8,379,101, entitled "Environment and/or Target Segmentation", filed May 29, 2009 and hereby fully incorporated herein by reference; U.S. patent application Ser. No. 12/603,437, issued on Oct. 23, 2012 as U.S. Pat. No. 8,295,546, entitled, "Pose Tracking Pipeline," filed on Oct. 21, 2009, and hereby fully incorporated herein by reference; U.S. patent application Ser. No. 12/475,308, published on Dec. 2, 2010 as U.S. patent publication No. 2010/0303289A1 entitled, "Device for Identifying and Tracking Multiple Humans Over Time," filed on May 29, 2009, and hereby fully incorporated herein by reference; U.S. patent application Ser. No. 12/641,788, published on Jun. 23, 2011 as U.S. patent publication No. 2011/0150271A1 entitled, "Motion Detection Using Depth Images," filed on Dec. 18, 2009, and hereby fully incorporated herein by reference; U.S. patent application Ser. No. 12/575,388, published on Apr. 7, 2011 as U.S. patent publication No. 2011/0080336A1 entitled, "Human Tracking System," filed on Oct. 7, 2009, and hereby fully incorporated herein by reference; U.S. patent application Ser. No. 12/422,661, issued on Aug. 9, 2011 as U.S. Pat. No. 7,996,793, entitled, "Gesture Recognizer System Architecture," filed on Apr. 13, 2009 and hereby fully incorporated herein by reference; and U.S. patent application Ser. No. 12/511850, published on Feb. 3, 2011 as U.S. patent Publication No. 2011/0025689A1, entitled "Auto Generating a Visual Representation," filed 29 Jul. 2009, fully incorporated herein by reference.

Figure 2:
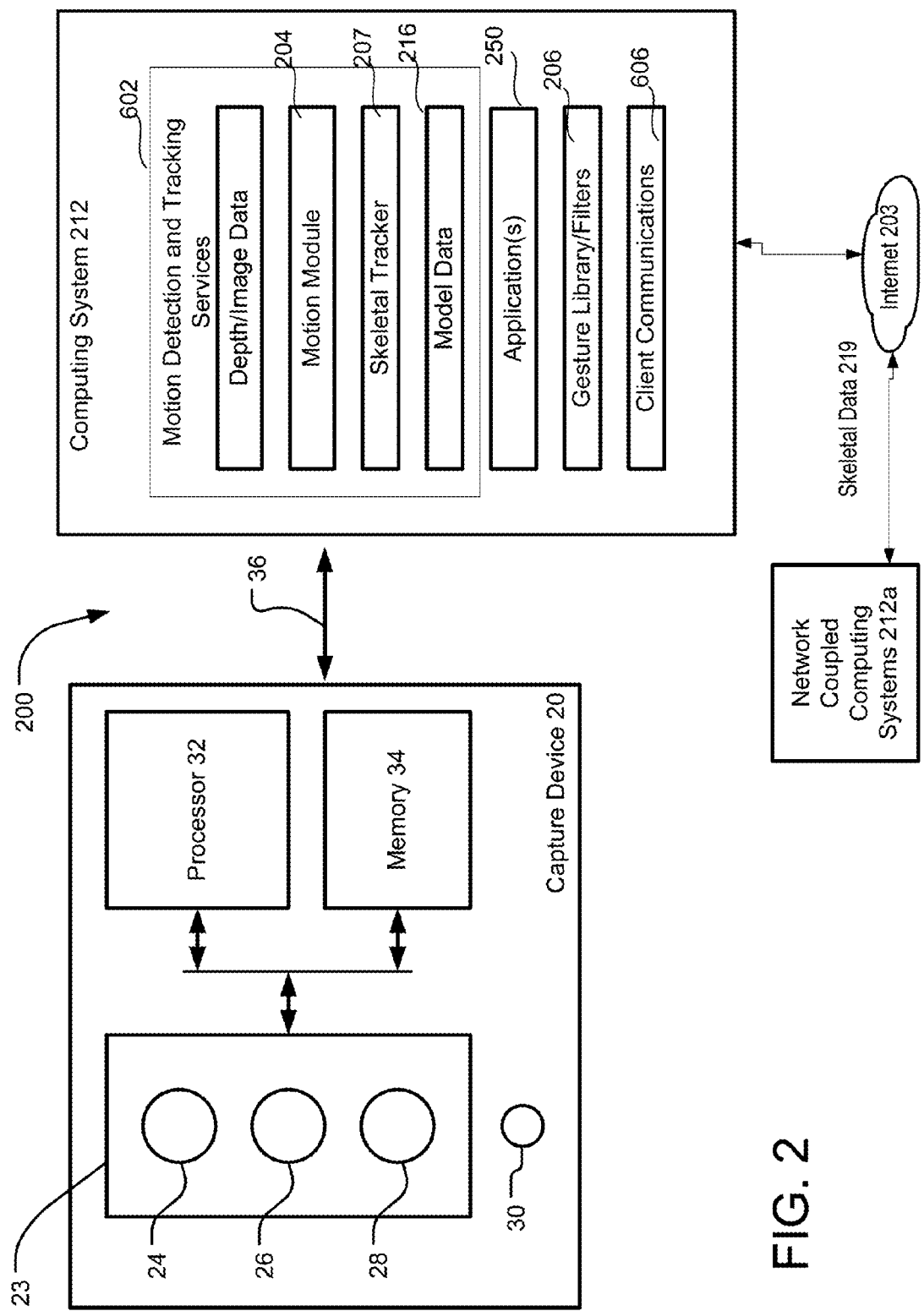
FIG. 2 is an illustrative embodiment of functional computer-implemented architecture for a system recognition sharing system and a capture device.

FIG. 2 is an illustrative embodiment of a functional computer-implemented architecture for a recognition and sharing system 200. The recognition and sharing system may include, for example, a capture device 20 and a computing system 212. Such an architecture system can be implemented as one or more processing modules which can operate by software executing on one or more processors and/or computer hardware or as hardware or firmware.

Capture device 20 may be used for target recognition, analysis, and tracking in a scene, where the target can be a user or an object. According to an example embodiment, the capture device 20 may be configured to capture video with depth information including a depth image that may include depth values via any suitable technique including, for example, time-of-flight, structured light, stereo image, or the like. According to one embodiment, the capture device 20 may organize the calculated depth information into "Z layers," or layers that may be perpendicular to a Z axis extending from the depth camera along its line of sight.

As shown in FIG. 2, the capture device 20 may include an image camera component 23. According to an example embodiment, the image camera component 23 may be a depth camera that may capture the depth image of a scene. The depth image may include a two-dimensional (2-D) pixel area of the captured scene where each pixel in the 2-D pixel area may represent a depth value such as a length or distance in, for example, centimeters, millimeters, or the like of an object in the captured scene from the camera.

As shown in FIG. 2, according to an example embodiment, the image camera component 23 may include an IR light component 24, a first sensor such as a three-dimensional (3-D) camera 26, and a second sensor such as an RGB camera 28 that may be used to capture the depth image of a scene. Each of these components is focused on a scene. For example, in time-of-flight analysis, the IR light component 24 of the capture device 20 may emit an infrared light onto the scene and may then use sensors (not shown) to detect the backscattered light from the surface of one or more targets and objects in the scene using, for example, the a 3-D camera 26 and/or the RGB camera 28. In some embodiments, pulsed infrared light may be used such that the time between an outgoing light pulse and a corresponding incoming light pulse may be measured and used to determine a physical distance from the capture device 20 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device 20 to a particular location on the targets or objects.

According to another example embodiment, time-of-flight analysis may be used to indirectly determine a physical distance from the capture device 20 to a particular location on the targets or objects by analyzing the intensity of the reflected beam of light over time via various techniques including, for example, shuttered light pulse imaging.

In another example embodiment, the capture device 20 may use a structured light to capture depth information. In such an analysis, patterned light (i.e., light displayed as a known pattern such as grid pattern or a stripe pattern) may be projected onto the scene via, for example, the IR light component 24. Upon striking the surface of one or more targets or objects in the scene, the pattern may become deformed in response. Such a deformation of the pattern may be captured by, for example, the 3-D camera 26 and/or the RGB camera 28 and may then be analyzed to determine a physical distance from the capture device 20 to a particular location on the targets or objects.

The capture device 20 may further include a microphone 30, or an array of microphones. The microphone 30 may include a transducer or sensor that may receive and convert sound into an electrical signal. According to one embodiment, the microphone 30 may be used to reduce feedback between the capture device 20 and the computing environment 212 in the target recognition, analysis, and tracking system 10. Additionally, the microphone 30 may be used to receive audio signals that may also be provided by the user to control applications such as game applications, non-game applications, or the like that may be executed by the computing environment 212.

In an example embodiment, the capture device 20 may further include a processor or microcontroller 32 that may be in operative communication with the image camera component 23. The processor 32 may include a standardized processor, a specialized processor, a microprocessor, or the like that may execute instructions that may include instructions for receiving the depth image, determining whether a suitable target may be included in the depth image, converting the suitable target into a skeletal representation or model of the target, or any other suitable instruction.

The capture device 20 may further include a memory component 34 that may store the instructions that may be executed by the microcontroller 32, images or frames of images captured by the 3-d camera 26 or RGB camera 28, or any other suitable information, images, or the like. According to an example embodiment, the memory component 34 may include random access memory (RAM), read only memory (ROM), cache, Flash memory, a hard disk, or any other suitable storage component. Together, the microcontroller 32 and memory may be collectively referred to as a microcontroller.

As shown in FIG. 2, in one embodiment, the memory component 34 may be a separate component in communication with the image capture component 23 and the processor 32. According to another embodiment, the memory component 34 may be integrated into the processor 32 and/or the image capture component 23.

As shown in FIG. 2, the capture device 20 may be in communication with the computing environment 212 via a communication link 36. The communication link 36 may be a wired connection including, for example, a USB connection, a Firewire connection, an Ethernet cable connection, or the like and/or a wireless connection such as a wireless 802.11b, g, a, or n connection. According to one embodiment, the computing environment 212 may provide a clock to the capture device 200 that may be used to determine when to capture, for example, a scene via the communication link 36.

Additionally, the capture device 20 may provide the depth information and images captured by, for example, the 3-D camera 26 and/or the RGB camera 28, and a skeletal model that may be generated by the capture device 20 to the computing environment 212 via the communication link 36. The computing environment 212 may then use the skeletal model, depth information, and captured images to, for example, control an application such as a game or word processor.

The capture device 20 can capture data at interactive rates, increasing the fidelity of the data and allowing the disclosed techniques to process the raw depth data, digitize the objects in the scene, extract the surface and texture of the object, and perform any of these techniques in real-time such that the display (e.g. 56) can provide a real-time depiction of the scene on its display screen (e.g. 54).

Figure 3:
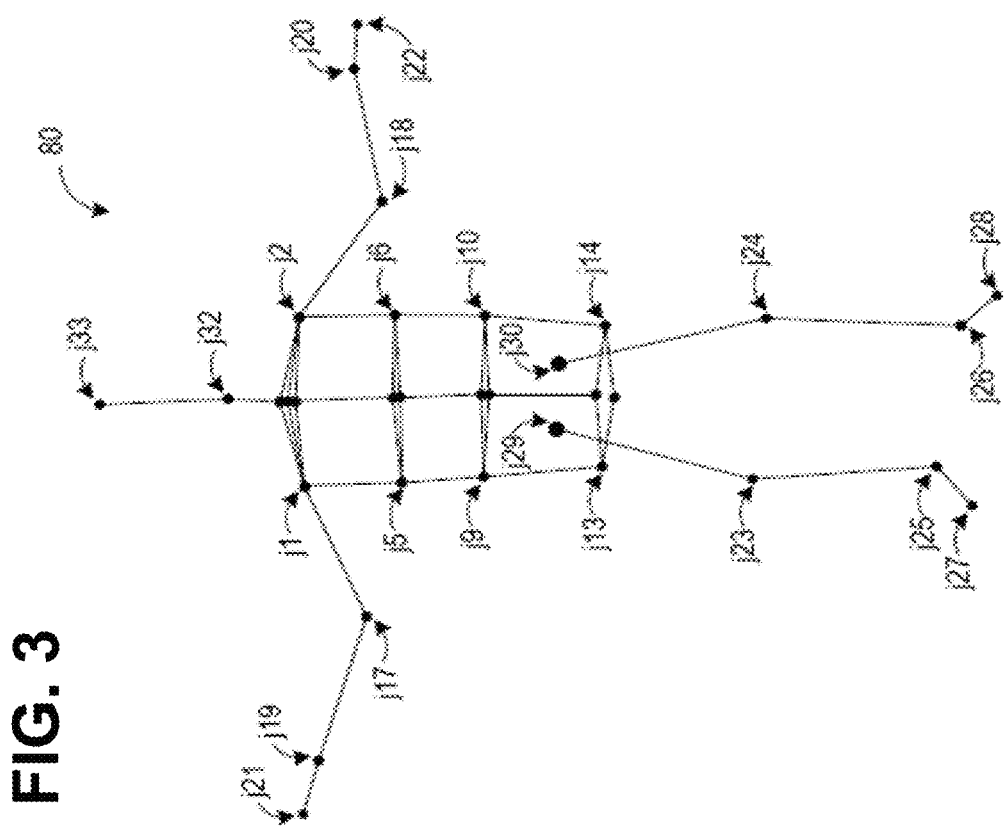
FIG. 3 illustrates an example embodiment of a computing environment.
Figure 4:
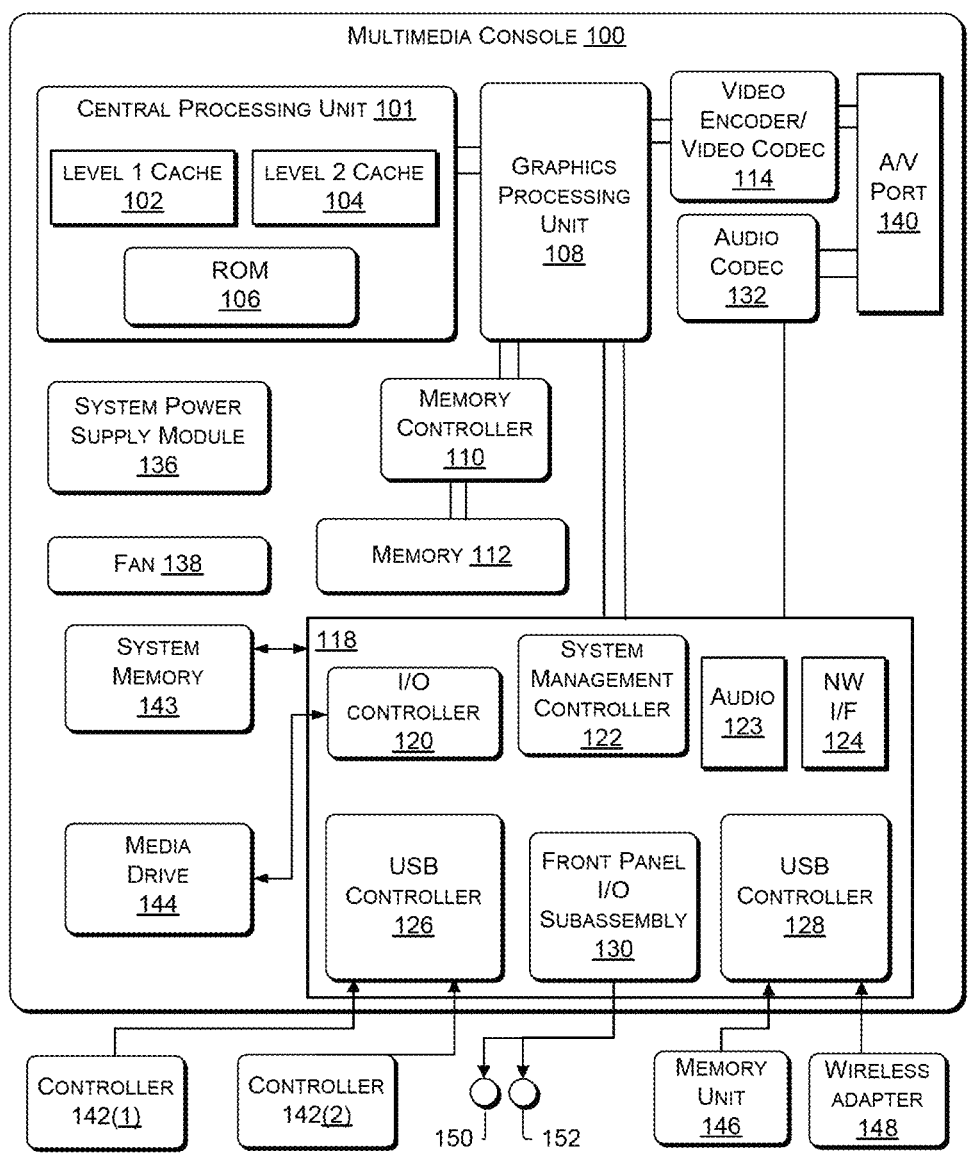
FIG. 4 illustrates an alternative example of a gaming environment.

In the system embodiment of FIG. 2, the capture device 20 is communicatively coupled 36 to a computing environment 212 such as the computer systems examples in FIGS. 3 and 4.

Computing system 212 includes motion detection and tracking services 602 which may include, for example, a depth and image detection module 202 a motion tracking module 204, a skeletal tracker 207, skeletal data 216. The motion detection and tracking services 602 provide motion data to one or more applications. It will be understood that applications 250 may be provided on the computing system 212, or in alternative embodiments such as those discussed below, on one or more devices 212a coupled to computing system 212 via a network 203. Network 203 may comprise one or more public and/or private networks, including the Internet.

Depth and image data is received by computing system 212 via link 36 and processed by the depth module 202. Data is used by the skeletal tracker to create skeletal model data 216 which can be associated with different targets or users in a scene. A scene is an area within a field of view of the capture device 20. Skeletal tracker 207 can detect movements of a target within the scene using the skeletal data, and provide the movement information to one or more application 250. Client communications services 606 provide networking connections to one or more devices 212a coupled via network 213 via standard communication protocols negotiated between the devices.

The model data 216 includes a model for the each target in a scene, which can be a skeletal model for example. The motion module 204 processes the input data with respect to the model data for the scene. A skeletal model may be implemented as one or more data structures representing body parts and their positions in dimensions and/or rotation angles with respect to a reference. The model data 216 can be updated with updated in terms of absolute positions or with changes in positions and rotations. The changes in positions and rotations may be represented as vectors and angles.

In the example embodiment shown, the avatar control system 202 receives motion tracking data 205 locally from the audiovisual data capture system 20. Additionally, the avatar control system 202 can receive motion tracking data remotely over the Internet 203 or other network. With respect to a user, motion tracking data may comprise the image data itself or a downsampled version of that data.

Some motions and poses, e.g. gestures, may be assigned a special meaning in the context of an application 250. Applications may have access to filters associated with gestures 206. In one example, the motion module 204 can select one or more gesture filters 206 based on an associative data index, such as a body part index for example. For example, when a motion tracking data set update is received by the avatar control system 202 and motion changes for certain body parts are indicated, the motion module 204 indexes gesture filters 206 associated with those certain body parts.

The gestures filters 206 execute instructions based on parameter data defining criteria for determining whether a particular gesture has been performed based on motion tracking data 205. In one embodiment, each gesture filter 206 is linked with a library module for a particular gesture in the gestures library 208. Each library module 208 associated with a gesture includes executable instructions to perform processing responsive to the gesture. This processing often involves updating the avatar's motion or image to reflect the gesture in some form.

The tracking of user motions may be performed in real time such that the user may interact with an executing application in real time. A real-time display refers to the display of a visual representation of a gesture, wherein the display is simultaneously or almost simultaneously displayed with the performance of the gesture in physical space. For example, an update rate of the display at which the system may provide a display that echoes a user may be at a rate of 20 Hz or higher, wherein insignificant processing delays result in minimal delay of the display or are not visible at all to the user. Thus, real-time includes any insignificant delays pertaining to the timeliness of data which has been delayed by the time required for automatic data processing.

The target recognition, analysis and tracking system 200 may determine whether the depth image includes a human target. In one embodiment, the edges of each target such as the human target and the non-human targets in the captured scene of the depth image may be determined. As described above, each of the depth values may represent a depth value such as a length or distance in, for example, centimeters, millimeters, or the like of an object in the captured scene from the capture device 20. According to an example embodiment, the edges may be determined by comparing various depth values associated with, for example, adjacent or nearby pixels of the depth image. If the various depth values being compared are greater than a predetermined edge tolerance, the pixels may define an edge. In one embodiment, the predetermined edge tolerance may be, for example, a 100 millimeters. If a pixel representing a depth value of 1000 millimeters may be compared with an adjacent pixel representing a depth value of 1200 millimeters, the pixels may define an edge of a target, because the difference in the length or distance between the pixels is greater than the predetermined edge tolerance of 100 mm.

According to another embodiment, predetermined points or areas on the depth image may be flood filled to determine whether the depth image includes a human target. For example, various depth values of pixels in a selected area or point of the depth image may be compared to determine edges that may define targets or objects as described above. In an example embodiment, the predetermined points or areas may be evenly distributed across the depth image. For example, the predetermined points or areas may include a point or an area in the center of the depth image, two points or areas in between the left edge and the center of the depth image, two points or areas between the right edge and the center of the depth image, or the like.

The Z values of the Z layers may be flood filled based on the determined edges. For example, the pixels associated with the determined edges and the pixels of the area within the determined edges may be associated with each other to define a target or an object in the capture area that may be compared with a pattern.

According to an example embodiment, each of the flood-filled targets, human and non-human may be matched against a pattern to determine whether and/or which of the targets in the capture area include a human. The pattern may include, for example, a machine representation of a predetermined body model associated with a human in various positions or poses such as a typical standing pose with arms to each side.

In an example embodiment, A human target may be isolated and a bitmask of the human target may be created to scan for one or more body parts. For example, after a valid human target is found within the depth image, the background or the area of the depth image not matching the human target can be removed. A bitmask may then be generated for the human target that may include values of the human target along, for example, an X, Y, and Z axis. According to an example embodiment, the bitmask of the human target may be scanned for various body parts, starting with, for example, the head to generate a model of the human target. The top of the bitmask may be associated with a location of the top of the head. After determining the top of the head, the bitmask may be scanned downward to then determine a location of a neck, a location of shoulders, and the like. The depth map or depth image data can be updated to include a probability that a pixel is associated with a particular virtual body part in the model.

According to an example embodiment, upon determining the values of a body part, a data structure may be created that may include measurement values such as length, width, or the like of the body part associated with the bitmask of the human target. In one embodiment, the data structure for the body part may include results averaged from a plurality of depth images captured in frames by the capture system 60 at a frame rate. The model may be iteratively adjusted at a certain number of frames. According another embodiment, the measurement values of the determined body parts may be adjusted such as scaled up, scaled down, or the like such that measurements values in the data structure more closely correspond to a typical model of a human body. A body model may contain any number of body parts, each of which may be any machine-understandable representation of the corresponding part of the modeled target.

In a model example including two or more body parts, each body part of the model may comprise one or more structural members (i.e., "bones"), with joints located at the intersection of adjacent bones. For example, measurement values determined by the bitmask may be used to define one or more joints in a skeletal model. The one or more joints may be used to define one or more bones that may correspond to a body part of a human. Each joint may allow one or more body parts to move relative to one or more other body parts. For example, a model representing a human target may include a plurality of rigid and/or deformable body parts, wherein some body parts may represent a corresponding anatomical body part of the human target. Each body part may be characterized as a mathematical vector defining joints and bones of the skeletal model. It is to be understood that some bones may correspond to anatomical bones in a human target and/or some bones may not have corresponding anatomical bones in the human target.

The bones and joints may collectively make up a skeletal model, which may be a constituent element of another model. The skeletal model may include one or more skeletal members for each body part and a joint between adjacent skeletal members. An exemplary three-dimensional skeletal models 80 is shown in FIG. 3, respectively.

FIG. 3 shows a skeletal model 80 as viewed from the front, with joints j1 through j33. The skeletal model 80 may include one or more joints j1-j33. According to an example embodiment, each of the joints j1-j33 may enable one or more body parts defined there between to move relative to one or more other body parts and to move independently of each other. For example, the bone defined between the joints j17 and j19 corresponds to a forearm that may be moved independent of, for example, the bone defined between joints j23 and j25 that corresponds to a calf.

As the user moves in physical space, as captured by capture system 20, the resultant image data may be used to adjust the skeletal model such that the skeletal model may accurately represent the user. According to an example embodiment, the model can be rasterized into a synthesized depth image. Rasterization allows the model described by mathematical vectors, polygonal meshes, or other objects to be converted into a synthesized depth image described in terms of pixels. Differences between an observed image of the target, as retrieved by a capture system, and a rasterized (i.e., synthesized) image of the model may be used to determine the force vectors that are applied to the model in order to adjust the body into a different pose. In one embodiment, one or more force vectors may be applied to one or more force-receiving aspects of a model to adjust the model into a pose that more closely corresponds to the pose of the target in the physical space of the capture area. The model may be iteratively adjusted as frames are captured. Depending on the type of model that is being used, the force vector may be applied to a joint, a centroid of a body part, a vertex of a triangle, or any other suitable force-receiving aspect of the model. Furthermore, in some embodiments, two or more different calculations may be used when determining the direction and/or magnitude of the force.

As an example of the synergy provided by these elements, consider that the IR light component 24 and the 3-D camera 26 may provide a depth image of a capture area, but in certain situations the depth image alone may not be sufficient to discern the position or movement of a human target. In those situations, the RGB camera 28 may "take over" or supplement the information from the 3-D camera to enable a more complete recognition of the human target's movement or position. For example, the RGB camera may be used to recognize, among other things, colors associated with one or more targets. If a user is wearing a shirt with a pattern on it that the depth camera may not be able to detect, the RGB camera may be used to track that pattern and provide information about movements that the user is making. As another example, if a user twists, the RGB camera may be used to supplement the information from one or more other sensors to determine the motion of the user. As a further example, if a user is next to another object such as a wall or a second target, the RGB data may be used to distinguish between the two objects. The RGB camera may also be capable of determining fine features of a user such as facial recognition, hair color and the like which may be used to provide additional information. For example, if a user turns backwards, the RGB camera may use hair color and/or the lack of facial features to determine that a user is facing away from the capture system.

Pixel data with depth values for an image is referred to as a depth image. According to one embodiment, the depth image may include a two-dimensional (2-D) pixel area of the captured scene where each pixel in the 2-D pixel area has an associated depth value such as a length or distance in, for example, centimeters, millimeters, or the like of an object in the captured scene from a point of reference, e.g. with respect to some aspect of the capture device 20. For example, the depth values for the pixels may be represented in "Z layers," which are layers that may be perpendicular to a Z axis extending from the depth camera 70 along its line of sight. These depth values may be referred to collectively as a depth map.

FIG. 4 illustrates a detailed example of an embodiment of a computing environment that may be used in a gaming console like that in FIG. 1 or a computing system 212 in FIG. 2 in which one or more embodiments of the technology can operate. As shown in FIG. 4, the multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are generally implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation generally is large enough to contain the launch kernel, concurrent system applications and drivers. The CPU reservation is generally constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay generally scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are generally scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager generally controls the switching of input stream, without knowledge the gaming application's knowledge and a driver maintains state information regarding focus switches. The image capture system 60 may define additional input devices for the console 100 (e.g. for its camera system).

Figure 5:
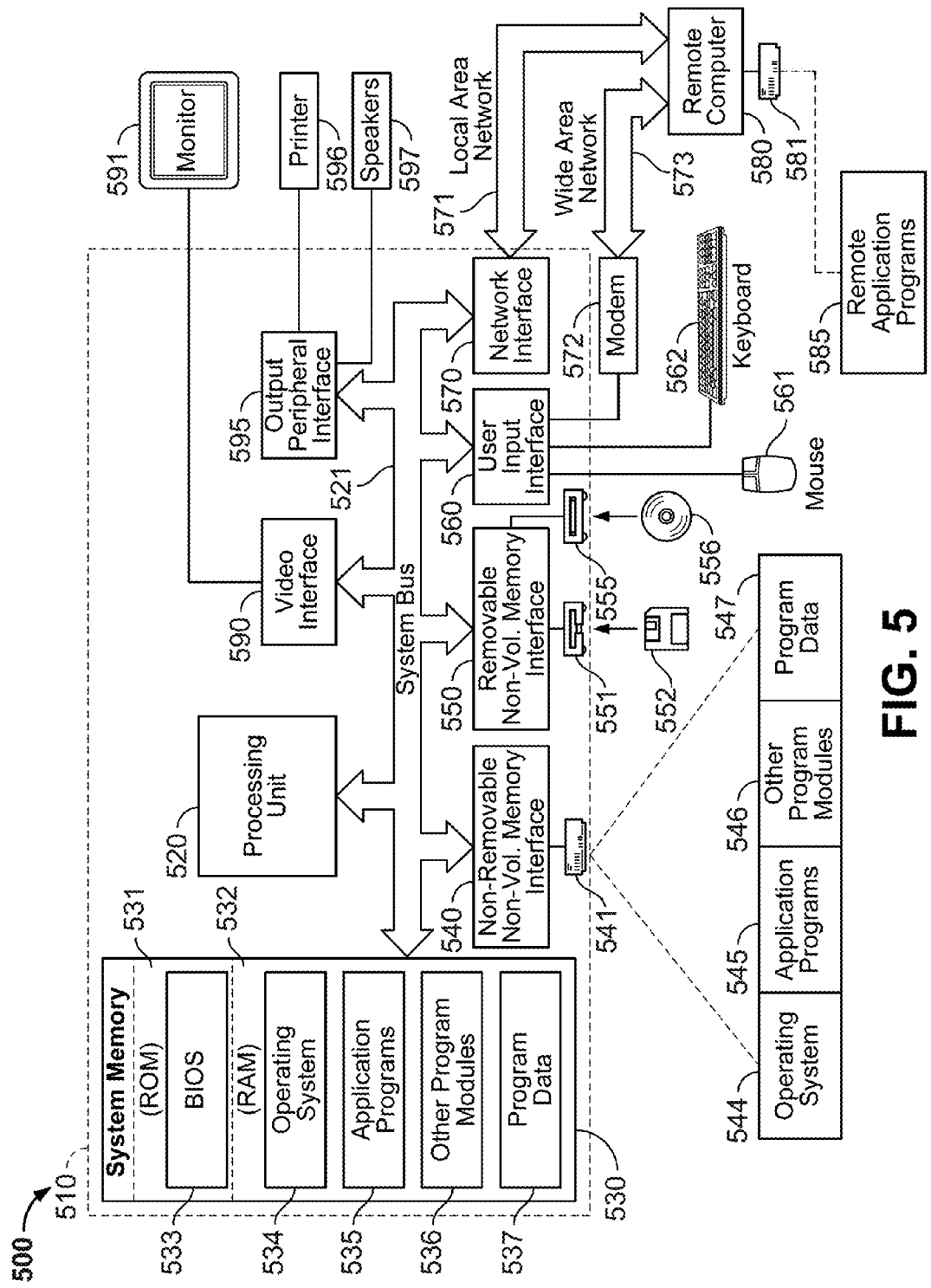
FIG. 5 illustrates an exemplary skeletal model of a user as viewed from the front that can be used by one or more embodiments.

FIG. 5 illustrates an example of a suitable computing system environment 500 such as a personal computer.

With reference to FIG. 5, an exemplary system for implementing the technology includes a general purpose computing device in the form of a computer 510. Components of computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 510 typically includes a variety of computer readable media. Computer readable media can be any available media that can be accessed by computer 510 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 510. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536, and program data 537.

The computer 510 may also include other removable/non-removable, volatile/nonvolatile computer storage media. By way of example only, FIG. 5 illustrates a hard disk drive 540 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through an non-removable memory interface such as interface 540, and magnetic disk drive 551 and optical disk drive 555 are typically connected to the system bus 521 by a removable memory interface, such as interface 550.

The drives and their associated computer storage media discussed above and illustrated in FIG. 5, provide storage of computer readable instructions, data structures, program modules and other data for the computer 510. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies. A user may enter commands and information into the computer 510 through input devices such as a keyboard 562 and pointing device 561, commonly referred to as a mouse, trackball or touch pad. Other input devices (not shown) may include a microphone, joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. In addition to the monitor, computers may also include other peripheral output devices such as speakers 597 and printer 596, which may be connected through a output peripheral interface 590.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted in FIG. 5 include a local area network (LAN) 571 and a wide area network (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560, or other appropriate mechanism. In a networked environment, program modules depicted relative to the computer 510, or portions thereof, may be stored in the remote memory storage device. By way of example, and not limitation, FIG. 5 illustrates remote application programs 585 as residing on memory device 581. It will be appreciated that the network connections shown are exemplary and other means of establishing a communications link between the computers may be used.

The device of FIG. 5 is but one type of processing device on which the technology may be implemented. The computing system environment 500 is only one example of a suitable computing environment and is not intended to suggest any limitation as to the scope of use or functionality of the technology. Neither should the computing environment 500 be interpreted as having any dependency or requirement relating to any one or combination of components illustrated in the exemplary operating environment 500.

Figure 6:
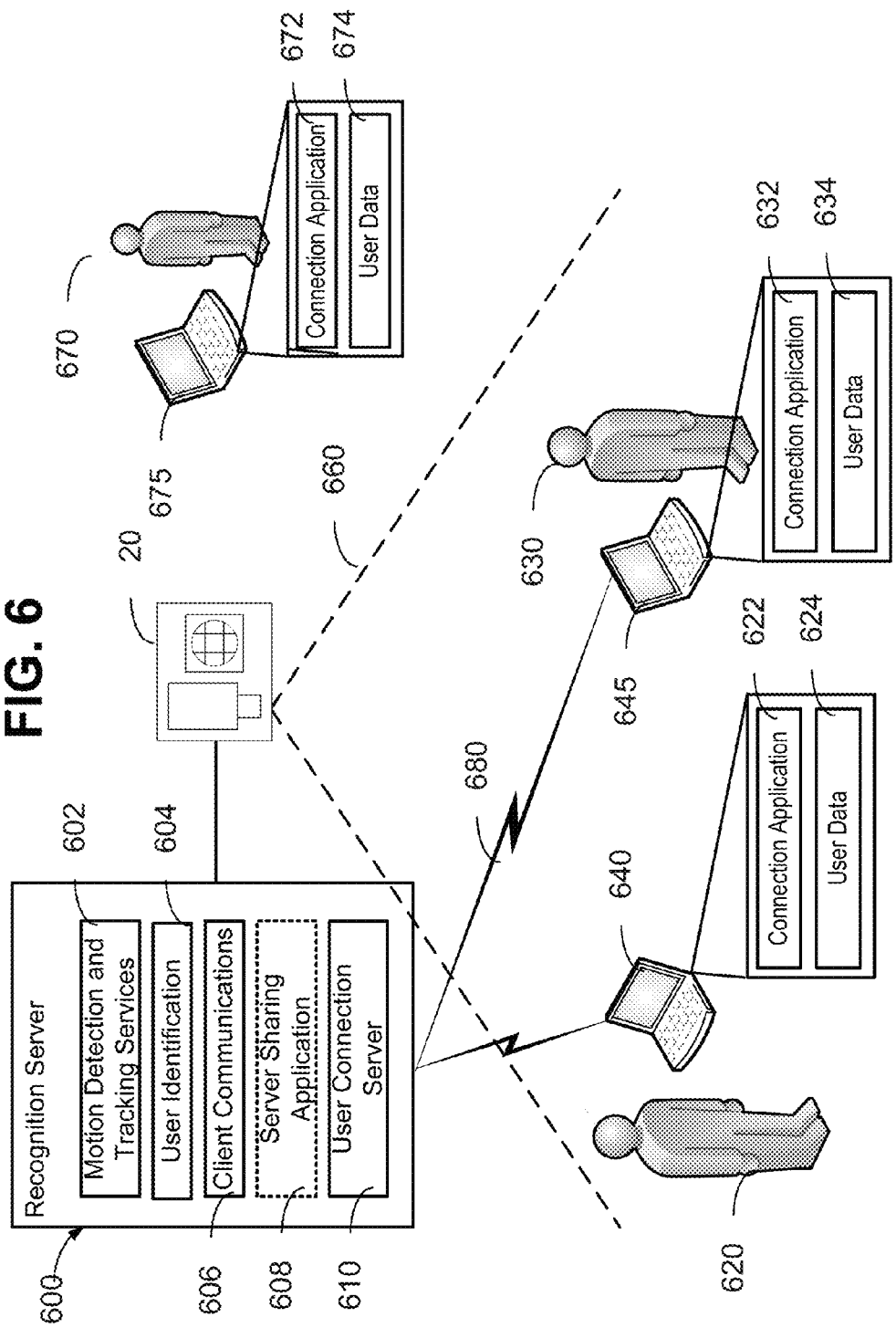
FIG. 6 is a block diagram illustrating the interaction of various components of the recognition and sharing system.

FIG. 6 illustrates a first embodiment of a recognition and sharing system in accordance with the technology. FIG. 6 illustrates recognition server 600 which is coupled to a capture device 20 as described above with respect to FIG. 2. The recognition server 600 includes motion detection and tracking services 602, also described above, a user identification service 604, client communications services 606, and a user connection server 610. Optionally, server based information sharing applications 608 may also be provided on recognition server 600. Recognition server 600 is implemented in one or more of the computing environments illustrated above with respect to FIGS. 3 and 4. The recognition server 600 enables users 620 and 630 to easily connect associated client devices, in this case notebooks 640 and 645, respectively, and perform a variety of information sharing tasks based on the users interactions with their notebook, each other, or the recognition server 600. While the present discussion concerns interactions between two users, the interactions and sharing of information may occur between any number of users.

Recognition server 600 provides a single perspective view, that of the capture device 20, in a given field of view 660. Other users, 670 having associated devices 675, or outside the field of view 660, may not be able to interact with the recognition server and users 620, 630. In an alternative embodiment, users who have previously been in the field of view 660 and who move out of the field of view, may retain some interactivity via the recognition server 600 and other users tracked by the system, as described below.

Motion and tracking services 602 operate, as described above, to enable the detection of one or more targets or users within the field of view 660 of the capture device 20. When users 630 move into the field of view 660 of the capture device 20, each user 620, 630, is detected, a skeletal model for each user constructed, and user movements within the field of view 660 in a scene are tracked by the motion detecting and tracking services 602. As discussed below, this tracking information may be provided to connection applications 622, 632 on user associated devices 640, 645, or to server based sharing applications 608.

User connection server 610 receives connection requests from client devices 640, 645. Connection requests may be generated by the connection applications 622, 632 by polling a known communication port monitored by the user connection server 610. Client communications 606 enable network devices 640, 645 and 675 to communicate with the recognition server via a wireless, wired, or other public or private network using any of a number of known communication protocols and techniques, including, but not limited to, TCP, UDP, and apple talk protocols. Other techniques for determining when a connection application 622, 632 may seek out a recognition server such as proximity to a server or based on connection via a wireless network 680 known to have a server 600 on the same subnet, may also be implemented.

Once a user device 640, 645 is connected, the user identification module 604, connection server 610 and motion detection and tracking services 602 determine an association between a user 620 and a device, for example device 640.

Once a user 620 enters a field of view 660, services 602 create and track a skeletal model for that user. The skeletal model is uniquely identified and tracked though no associated computing device or user has been linked to the model. When a connection application 622 is connected to the connection server 610, it will request information on which skeletal model tracked by the system relates to the device's associated user. In one embodiment, RGB data and skeletal model data for various users in the room are provided to the client connections applications and the client applications identify their associated user. The client application then requests ownership of that application on the server thereby associating the processing device and the user. Alternatively, an association may be made by the recognition server based on information provided to the recognition server by the client application.

Once the user's skeletal model is determined, and the user identified as associated with a particular skeletal model and device, interactions between users can enable different information sharing function. Information sharing may include, but not be limited to, file sharing, personal information exchange, and, in one embodiment, one or more predefined functions.

In the embodiment shown in FIG. 6, each client device 640 and 645 includes a connection application 622, 632, respectively, and optionally, user data 624, 634, within each device. Each user, 620, 630, 670, is in control of their respective device 640, 645, 675. The respective connection application 622, 632, 672 communicates with client communication services 606 and the user connection server 610 once the client device 640 is within a communication range of the server 600. In one embodiment, each application 622, 632, 672 can communicate with client communications and the user connection server even if the users 620, 630, 670 are outside the field of view 660, such as user 670 in FIG. 6. However, because user 670 is outside the field of view 660, skeletal tracking data for the user cannot be acquired and tracked by motion detection and tracing services 602. Once a user is within the field of view, interactions between the users can enable information sharing functions. The particular operation of the connection application 622, and the user connection server 610, are described below with respect to FIG. 10, 11, and an exemplary sharing embodiment in FIG. 12.

In the example shown in FIG. 6, once a user 620 enters the room with a client device 640, connection application 622 will, via communication services 606, search for a detect a recognition server 600. The user connection server will note the connection of a client device 640, and client device 640 will request whether the user associated with the client device 640, in this case user 620, has been identified by the motion detection and tracking services 602. If so, connection application 622 will request ownership of the skeleton model associated with the user and user identification module 604 will assign ownership of the skeleton module to device 640 and user 620. Once ownership of the skeleton model is acquired, interaction of that skeleton model (and of user 620) with other users within the field of view and whose devices have connected via the user connection server can occur in accordance with the description of the technology herein.

Figure 7:
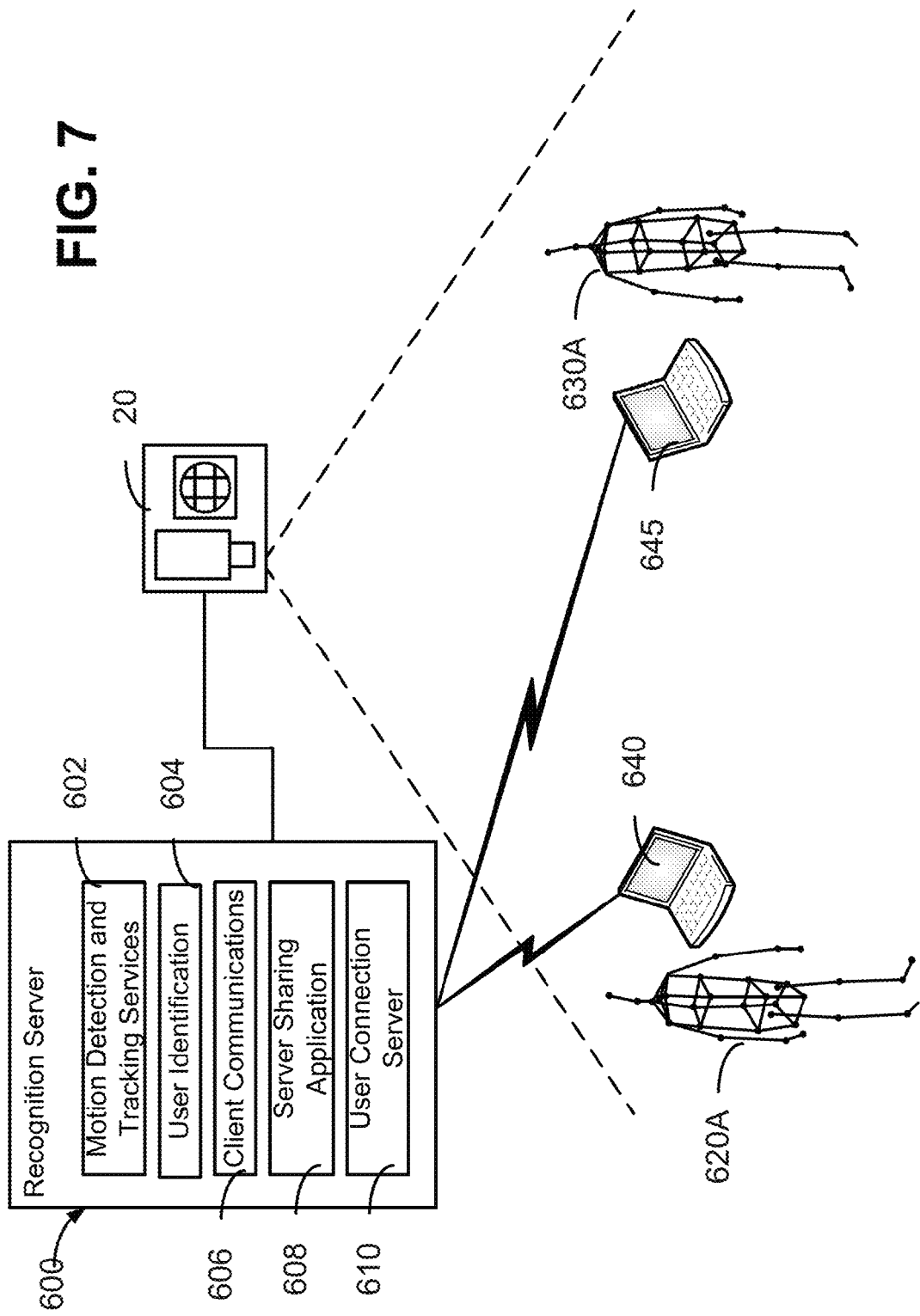
FIG. 7 illustrates the block diagram of FIG. 6 illustrating skeletal data for two users of the recognition and sharing system.

FIG. 7 illustrates one example of skeletal models 620A and 630A of user 620 and 630 as shown in FIG. 6. In FIG. 7, user 620 is associated with skeleton model 620A and user 630 is associated with skeleton model 630A. The user identification module 604 will associate skeleton model 620A with device 640 and skeleton model 630A with device 645. Movements of the two skeleton models in the field of view will be tracked, and interactions detected between them.

Interactions between users may comprise physical interactions between the skeletal models, audible interactions with the user connection server directly or with other users, or a combination of physical interaction with the skeletal models and audible interactions. Specific gestures may also be detected and may comprise interactions relative to other skeletal models in a particular of view 660.

Figure 8:
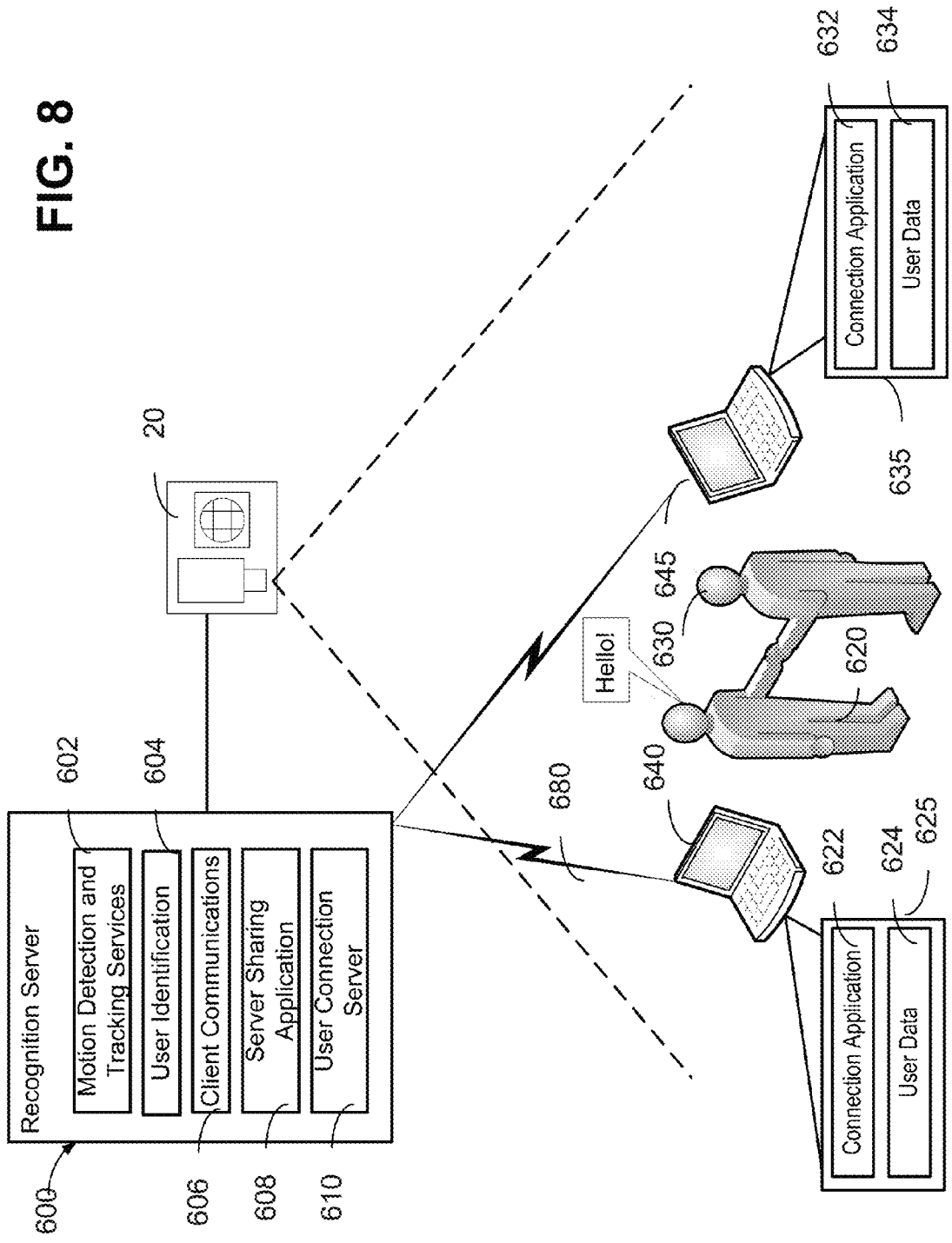
FIG. 8 illustrates the block diagram of FIG. 6 showing two users interacting in view of the recognition and sharing system.

FIG. 8 illustrates an exemplary interaction between user 620 and user 630. In FIG. 8, users 620 and 630 are shaking hands and user 620 is greeting user 630 with an audible greeting. In this example, the interaction may be recognized by the gesture made when the two skeletal models are in close proximity and recognized to be shaking hands, or the proximity of the skeletons (with or without the handshake) coupled with the verbal indicator "hello". Any number of other types of interactions be recognized as defining a gesture that is recognized as an interaction. Based on this interaction, the connection server may recognize that the users wish to share information and notify connection applications 622, 632 (and/or optionally server sharing application 608) of the connection between the users. In one embodiment, sharing functions are defined by the connection applications based on the interactions detected by the recognition server. In alternative embodiments, server sharing application 608 are provided and connections between users are handled at the server level.

Figure 9:
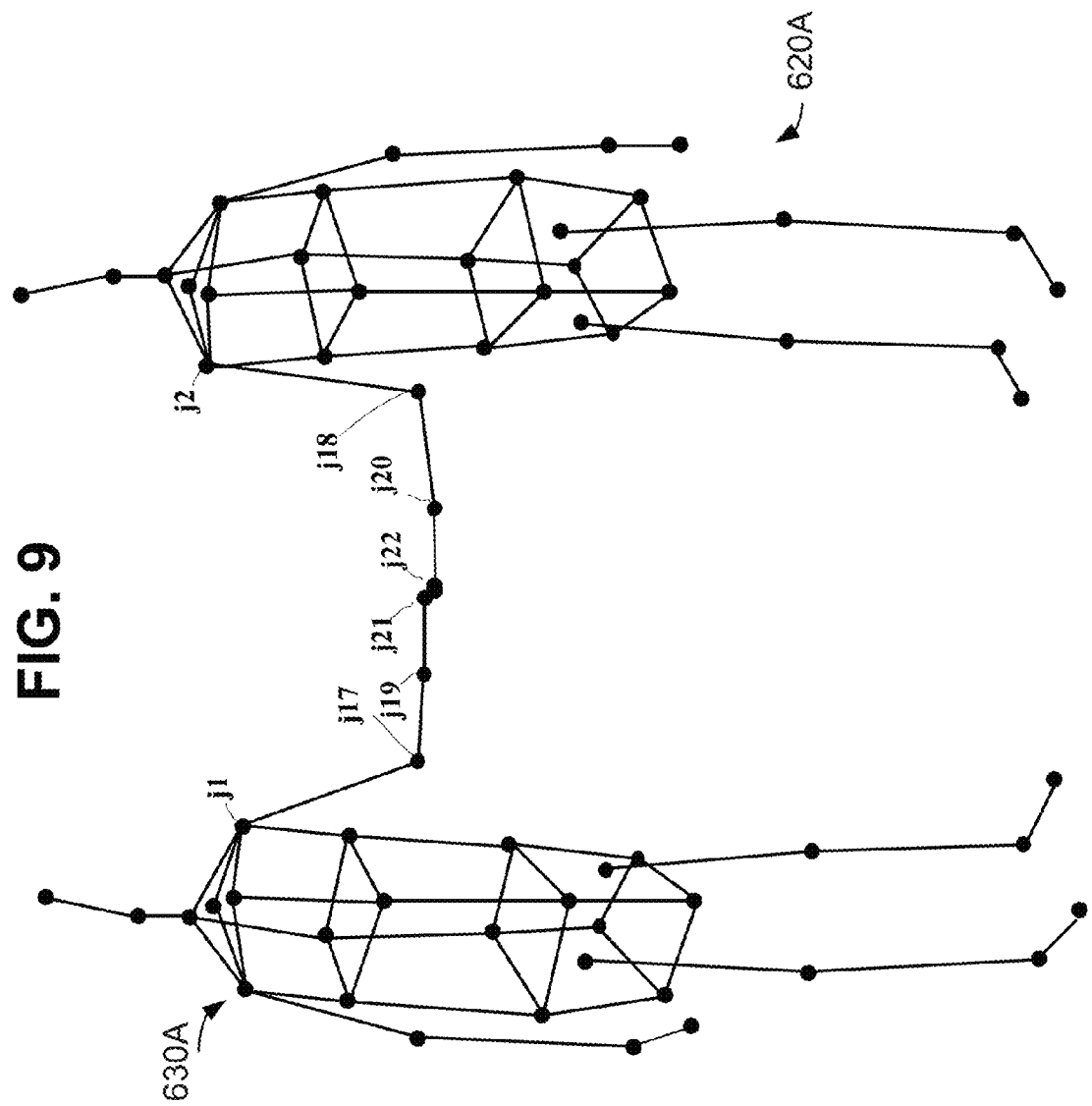
FIG. 9 illustrates a skeletal model representation of the users interacting in FIG. 8.

FIG. 9 is a skeletal model representation of the interaction shown in FIG. 8. The act of shaking hands between two users may be detected when two skeletal models have a proximal relationship to each other defined by a given distance, when the particular tracking points J22 of model 620A are in close proximity and points j20, j18 and j2 in spatially related to similar points j21, j19, j17, j1 of the opposing user's opposite arm on model 630A, and/or when the models interaction shown in FIG. 9 is associated with an audible command such as a greeting, a specific command directed at the server, or any interaction audibly detected in a temporal relationship to the relationship of the skeletons shown in FIG. 9. Once this interaction is detected between the two users 620, and 630, the user connection server can enable sharing services 608, or provide this information to client applications 622, 632, thereby allowing the client application 622, 632 to communicate directly.

Figure 10:
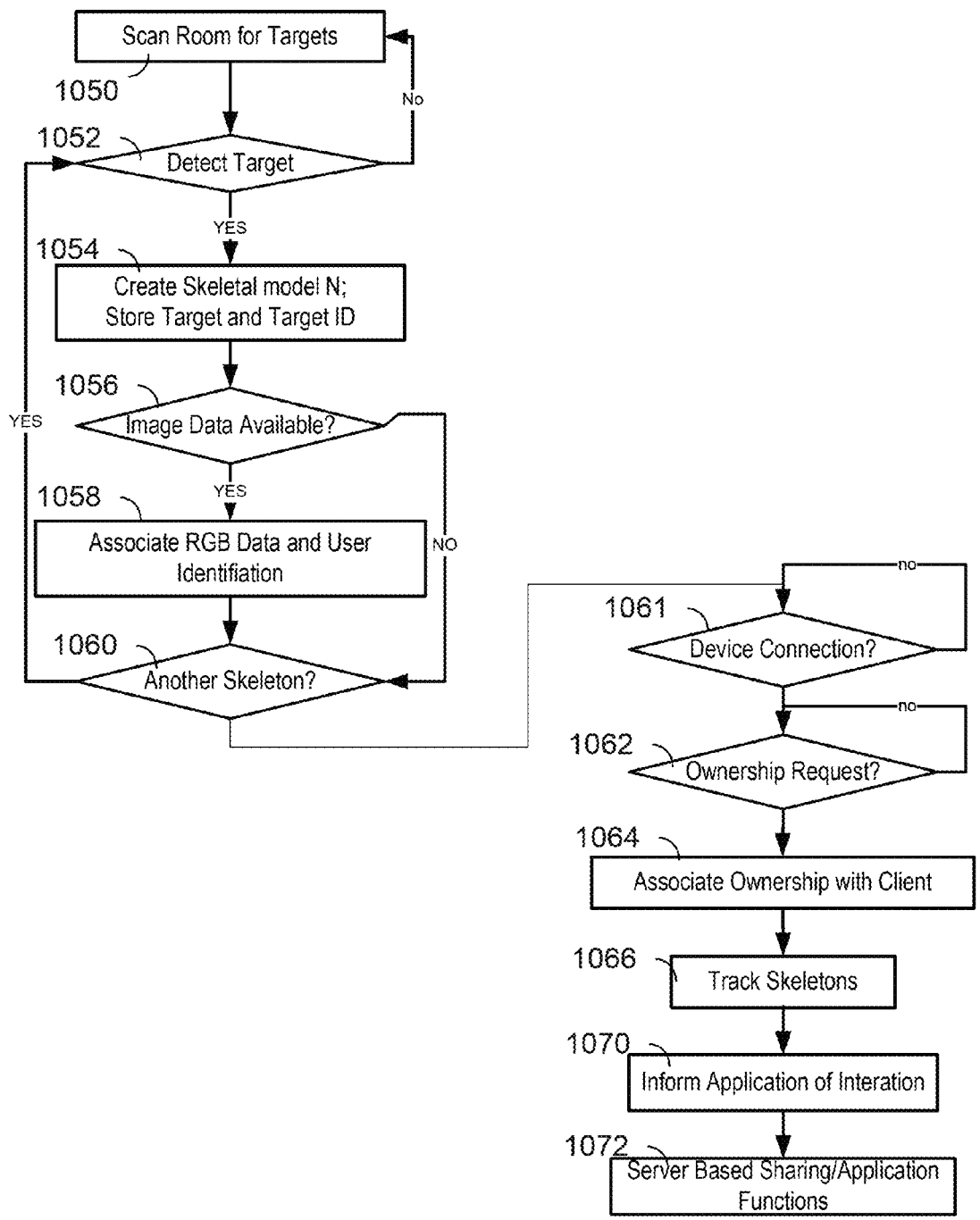
FIG. 10 is a flowchart illustrating a method performed on a recognition and sharing server.

FIG. 10 illustrates a process occurring on the recognition server 600 which is monitoring a room for users having connection applications on respective associated processing devices. At step 1050, a room is scanned for targets using the capture device 20. The scanning is continuous until a target is detected at 1052. Scanning may be performed by the motion detection and tracking services 602. Once a target is detected at 1052, a skeletal model is created for each identified target, and assigned an identifier at 1054. The target and its associated skeletal model are stored until an ownership request is received at 1062. Once the skeletal model is created, a determination is made as to whether or not image data associated with the skeletal model is available. Image data may be acquired from the capture device 620, or, as discussed below, from alternative sources such as cameras on the processing devices associated with the user, or from other databases having user image information. If image data is available at 1056, then image data will be associated with the skeletal model and stored until an ownership request 1062 for the skeletal model has been received. At 1060, the application continues scanning for additional targets as such targets enter the room. When targets leave the room, data stored with respect to skeletal models may be released, or retained for a fixed period of time as determined by an administrator of the connection server.

As noted above, client connection applications 622, 632 may seek out recognition servers when such servers are available. At 1061, the recognition server awaits a connection by a client connection application. Once a device connects, at 1062, the user connection server waits until an ownership request is received from a client connection application. Upon receiving a request at 1062, an association will be made between the processing device and a particular skeletal model at 1064. In one embodiment, the association of ownership with a particular skeletal model will be performed by the client application. In alternative embodiments, the connection application may make the association using recognition data retained by it from prior identifications, or data from a contacts database which includes RGB data. As described below, identification of a user association with a particular skeletal model will be performed by associating the RGB data of a user's identity with a known RGB data for the user, using image comparison techniques. This comparison may be performed on the client devices 640, 645 or on the server 600. In this instance, the client application will possess data on how the user associated with the particular processing device appears. RGB data may be transferred at step 1064 in response to an ownership request by a client application. Once the client applicant identifies its user as associated with a particular skeleton, it can request an ownership grant from the server and the server can associate the client and the client's processing device with a particular user. Although RGB data is used for recognition in one embodiment, other types of recognition technology may be used including, for example, voice recognition, skeletal recognition or any combination of RGB, skeletal and/or voice recognition.

At 1066, skeletal models are continually tracked for their movements throughout the room. At 1070, sharing applications are informed of user interactions. Informing a sharing application may comprise, in one embodiment, providing the sharing application with skeletal model data for the applications' owned skeleton and allowing the application to determine interaction with another user. Alternatively, the server may watch for interactions and notify the sharing application when a significant gesture comprising an interaction occurs. Informing a connection application at step 1070 may include informing a client connection application, or the server connection application 608. Various embodiments of how each of the connection applications operate based on being informed of an interaction are illustrated below. Optionally, at 1072, if sharing application 608 is enabled on server 600, information sharing functions may occur as described below in accordance with the various embodiments described herein. As noted above, this can include merely connecting two different users with authoritative privilege on each other's machines, providing a shared work space, providing peer-to-peer connectivity between the devices, or any number of variations or actions based on the interaction detected at 1068. Alternatively, step 1072 is performed by the client sharing applications 622, 632.

Figure 11:
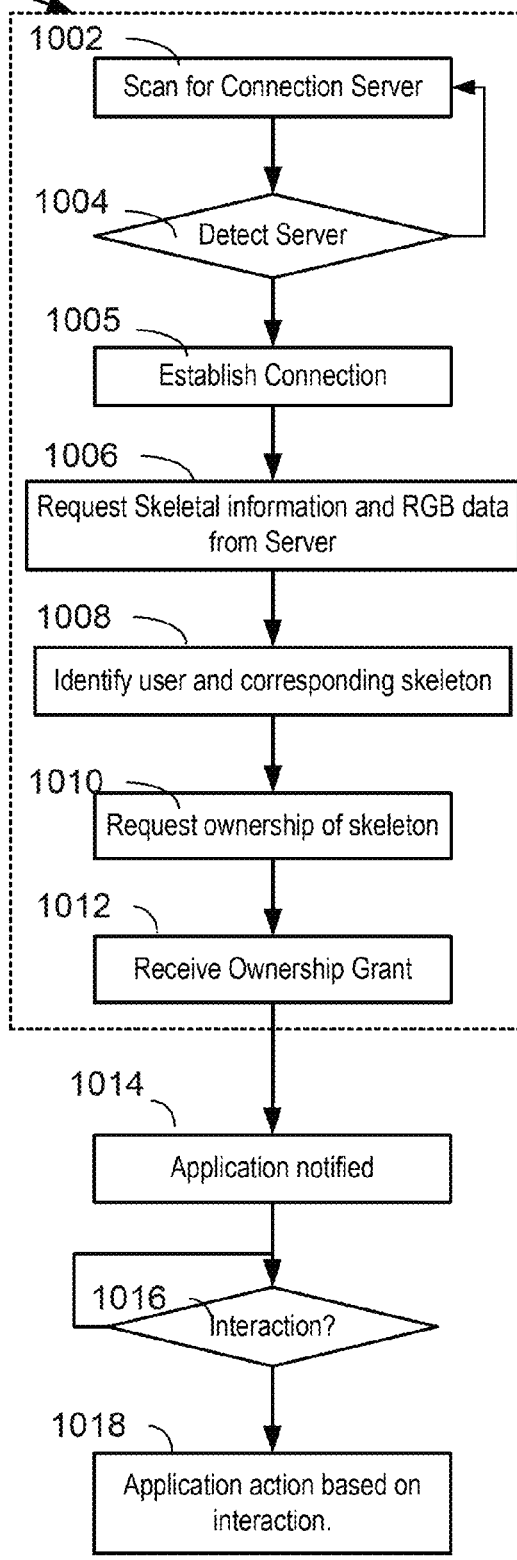
FIG. 11 is a flowchart illustrating a method performed on a user processing device in a recognition and sharing system

FIG. 11 illustrates the process which may occur by the connection application, such as application 622 or 632, when a processing device associated with a user enters the realm of a connection server 600. At 1002, a client application seeks a connection server. When a connection server is detected at 1004, a connection is established at 1005 and the client makes a request for skeletal model information and RGB data for different skeletal models in the room at 1006. As noted above, a request for skeletal model information can be provided as part of step 1064 by the server in FIG. 10. Upon receipt of the skeletal information and RGB data from the server, the client application identifies the user and the corresponding skeleton at 1008, and at 1010 requests ownership of the skeletal model from the server. It should be noted that the step 1008 of identifying the user and the corresponding skeletal models may be performed at the server rather than the client, in alternate embodiments. In addition, step 1008 is performed by matching the RGB data provided the server at 1006 to known user identity RGB data stored on the client. At step 1012, the client receives an ownership grant of the skeletal model which was assigned by the server.

To determine ownership of the skeleton model which identifies a user, the client application will receive one or more skeleton models within the field of view 660 of the connection server. A skeleton model generally consists of three dimensional point space and vector data, as described above, the quantity of such information is relatively small compared with the amount of data used by RGB images to identify the user. If the connection server identifies there are multiple skeletons in a room, then the server may provide information on all of the skeletal models and associated RGB data, or a subset of such data, based on several determinative characteristics. For example, if the server detects that the request has come from a device which has recently entered the room and the server knows that a particular skeleton has recently entered the room, the server may choose to forward a skeletal model it created most recently, since it is more likely to be associated with the server making the request than other clients already in the room. In addition, it is more likely that clients will request ownership of skeletons in a time related fashion to the presence of the skeleton entering the field of view. Still further, the server may block connections by skeletons not in the room.

It should be noted that the server may receive conflicting requests from different clients for the same skeletal models. The server can resolve these issues in any number of ways, including giving priority to a first client to request the skeletal model or performing a separate determination based on which skeletal model is more likely associated with a particular device. For example, if a server knows conflicting request have come from different devices, one of which is a notebook and the other is a processing device, the server may scan the room for an object resembling a notebook in proximal relationship to the skeletal models in conflict, and grant ownership of the skeletal model closer to the notebook to the notebook requesting device.

Once an ownership grant is received at 1012, in one embodiment, server applications may both detect skeletal interactions and control connections between the client devices. Where server based sharing applications are utilized, only steps 1002-1012 need be performed by the client sharing applications.

In the embodiment illustrated in FIG. 11, the client connection application will receive skeletal model data at 1014 from the server and the connection application will make a determination at 1016 as to whether the skeleton model associated with and owned by a particular client application has participated in an interaction with another skeletal model. Once the determination is made at 1016, the connection application can take any number of actions based on the nature and context of the interaction at 1018. As noted above, different types of interactions may result in different types of connections or associations between respective client devices. Examples of these different interactions are set forth below.

Figure 12:
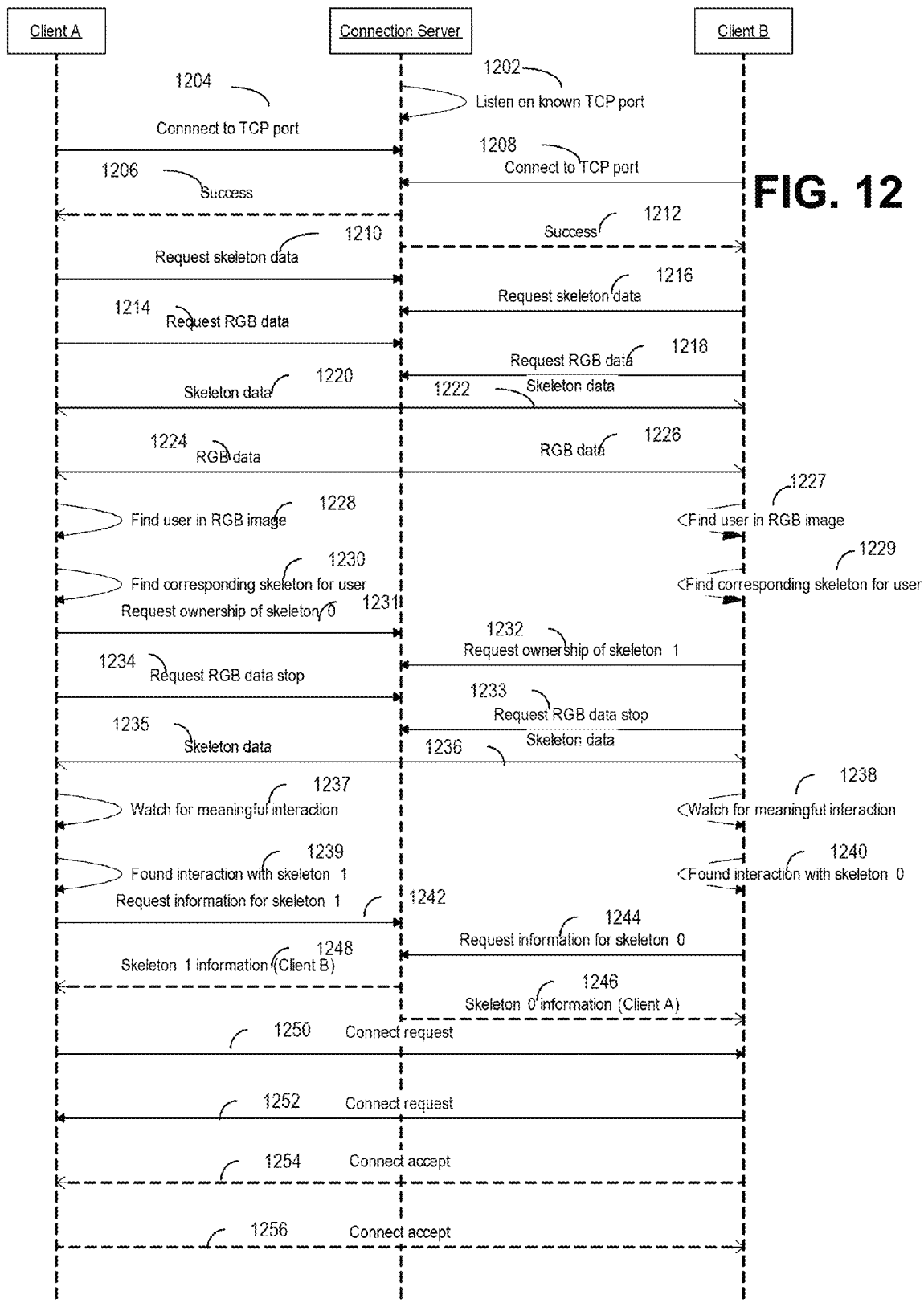
FIG. 12 is a UML diagram illustrating a sharing example of the present technology between two processing devices and a connection server.

FIG. 12 is an illustration of one such interaction between two client sharing application, client A and client B, and a connection server 600. FIG. 12 illustrates a connection between two client applications sharing information directly using the connection server 600 as an intermediary.

Connection server 600 will be in a state where it is listening at 1202 for client connections, for example, on a known TCP port at 1202. Both client A at 1204 and client B at 1208 will make an attempt to connect to the TCP port by, for example, repeatedly polling the port or when they connect to a new network including a connection server. The connection server acknowledges the connection attempt and connects to each client at 1206 and 1212, respectively, Client A at 1210 and client B at 1216 will each request their own skeletal model data. Likewise, at 1214 and 1218, each client will request RGB data available from the capture device. RGB data may be a view of the entire scene. Skeletal data is returned to client A at 1220 and client B at 1222. The data returned at 1220 will, in one embodiment, be data for a skeleton model which appeared before the data returned at 1222 since, in the illustration shown in FIG. 12, the request for skeletal data 1210 preceded the request for skeletal data 1216 in time. Alternatively, all skeletal models available from the tracking system will be returned. Likewise, the RGB data 1224 for the scene is returned to client A and the RGB data is returned to Client B at 1226. At 1228 and 1230, client A will match the RGB image of users in the scene to the user's known image information. Skeletal data associated with a particular user in the RGB image will then be determined at 1230 and a request for ownership of the skeletal model returned at 1231. The skeletal data and RGB image represent the same physical space. As such, the client is able to correlate a user found in the RGB image with the corresponding skeletal data. Likewise client B will search for its user in the RGB image and corresponding skeletal model for its known user will be determined at 1229. It will issue its own request for ownership of skeleton 1 at 1232. Once both clients issue a request for ownership of their respective skeletons, at 1232 and 1234, both will issue an RGB stop command 1233, 1234. This will limit the amount of RGB data that is provided to each of the respective clients. At 1235 and 1236, skeletal model data will be provided to both clients. (e.g. step 1016 in FIG. 11), and both respective clients watch (1237, 1238) for meaningful interactions between the owned skeleton and other skeletal models in the room. At 1239, client A determines that a meaningful interaction between its own skeletal model, skeleton 0 and the skeleton owned by client B, skeletal model 1, has occurred. At 1242, client A will request information for skeletal model 1. Likewise, client B will detect the same meaningful interaction and request information for skeletal model 0 at 1244. Information for skeletal model 0 will be returned to client B at 1246 and information for skeleton 1 will be returned to client A at 1248. At 1250, client A may initiate a connection request with client B directly or, client B may issue a connection request to client A at 1252. After standard protocol connections are established at 1254 and 1256, a connection will exist between client A and client B so that transfer of information may occur directly. The application may allow for a transfer of files, contact information or other such information as defined within the application or by the user after the connection has been made.

Figure 13:
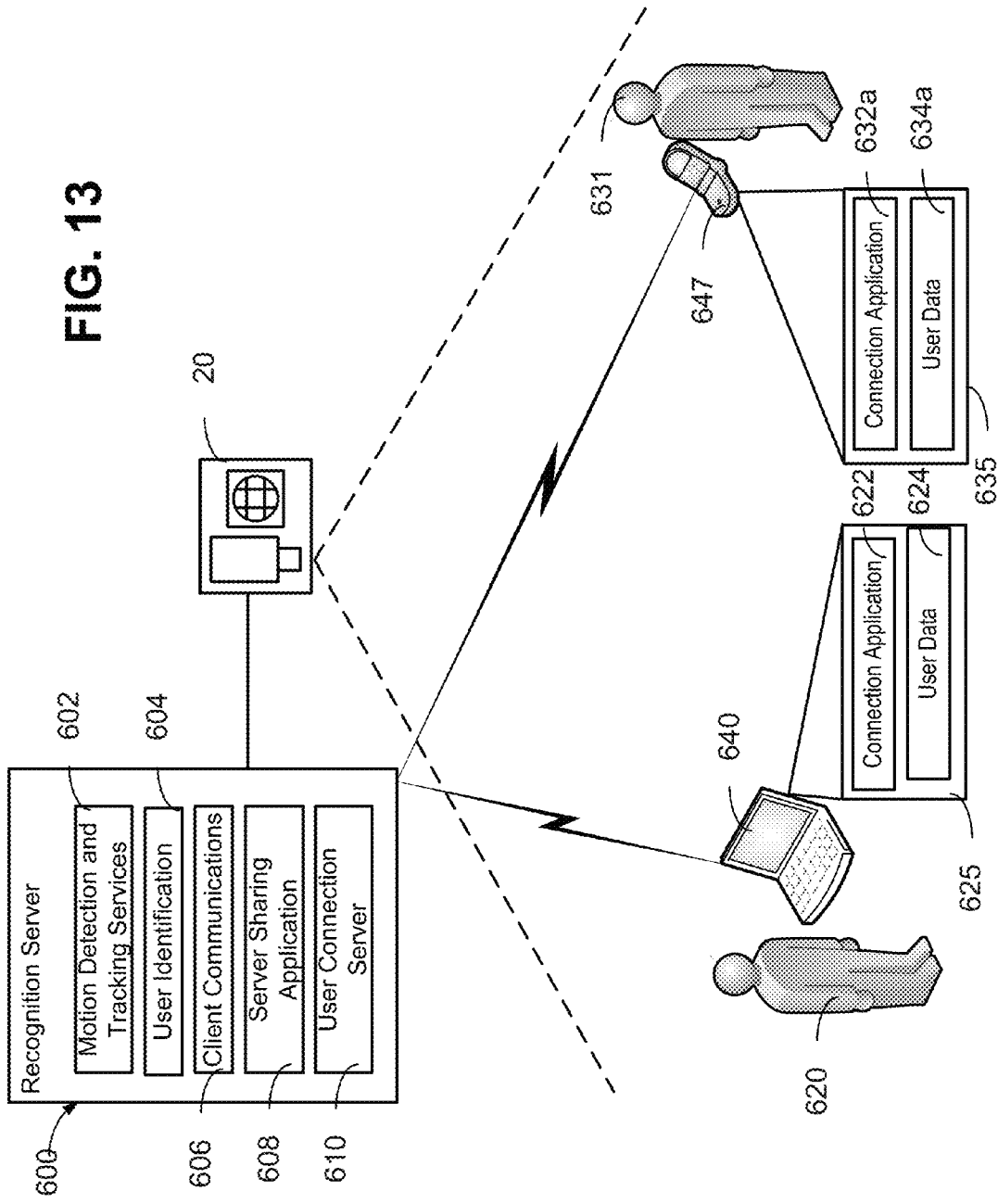
FIG. 13 is a block diagram illustrating an alternative client device interaction in the recognition and sharing system

FIG. 13 illustrates an alternative implementation of the system wherein the client devices within the field of view 660 are a notebook 640 and a mobile device 647. The mobile device may have more limited processing power and limited user data than the notebook computer 640. In this instance, predefined actions may comprise a transfer of contact information from the phone to the notebook once the users shake hands as illustrated in FIG. 9 if the mobile device user 631 has never encountered notebook user 620 before. Other predefined actions may occur. Mobile device 647 will likewise have connection application 632A and user data 634A which operates in a manner as discussed above with respect to FIG. 11.

Figure 14:
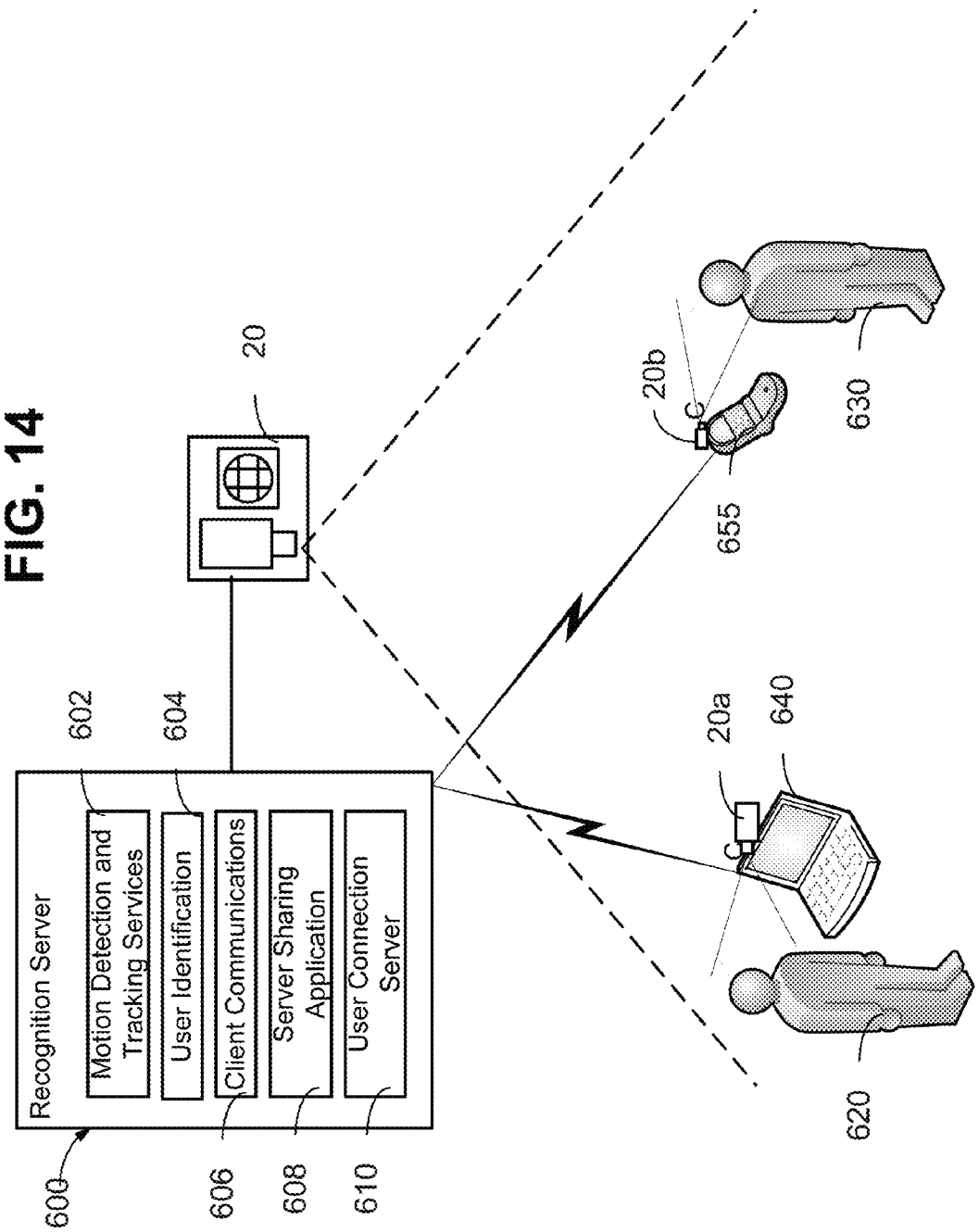
FIG. 14 is a block diagram illustrating an RGB data source using client based RGB capture devices in the recognition and sharing system.

FIG. 14 illustrates another alternative of the technology wherein the RGB data provided to the connection server is provided by capture devices 20A, 20B which are coupled to user devices 640 and 655. RGB data may be provided at the time of connection, based on stored information on either of the two devices 640, 655, or, as noted below, from a database which is connected to the connection server 600. In yet another embodiment, cameras 20A and 20B may provide additional skeletal models and additional tracking information to the motion detection and tracking services 602. As will be understood by reference to the co-pending applications disclosed herein, because cameras 20A and 20B are positioned more closely to the users 620 and 630, respectively, resolution of facial patterns and other finer based gestures, such as hand gestures, can be detected by the capture devices 20A and 20B at a greater resolution than capture device 20 within its field of view 660. As such, additional gestures and additional interactive motions and sounds may be provided via the capture devices 20A and 20B to the motion detection and tracking services.

Figure 15:
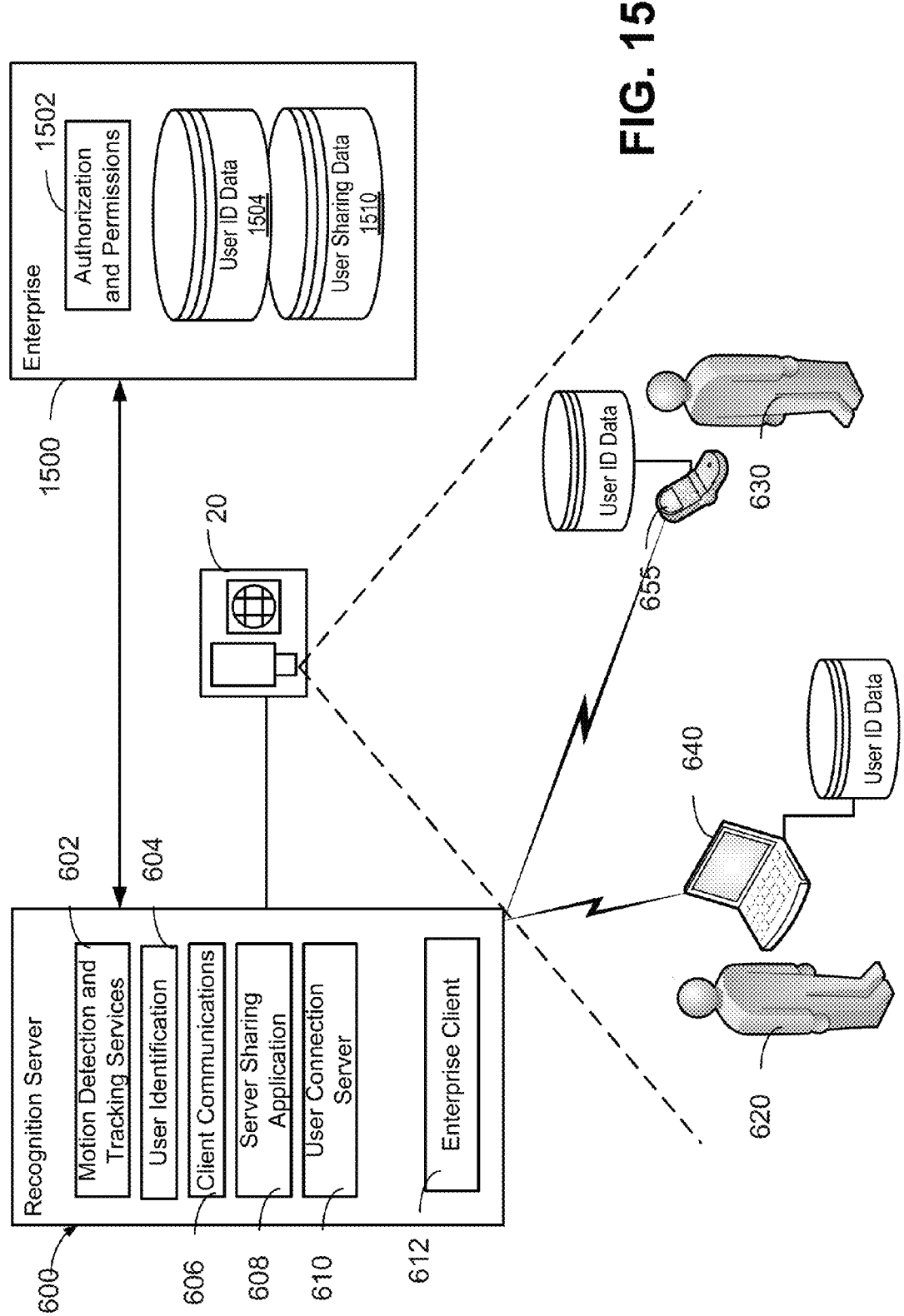
FIG. 15 is a block diagram illustrating a recognition and sharing system integrated with an enterprise environment.

FIG. 15 illustrates yet another embodiment where user identification data can be provided via one of any number of multiple sources. User identification data may be provided by each of the mobile devices 640 and 655 which are engaged with the user connection server. Alternatively, or in addition, connection server 600 be coupled to or part of an enterprise environment 1500. An enterprise environment may include an authoritative server 1502, user identification data 1504 and user sharing data 1510. User ID data may be accessed by recognition server 600 to identify users entering the field of view of capture device 20 using known imaging information in the user ID data for all users who are authorized users of the enterprise 1500. Enterprise 1500 may include authorization and permission services which identify users based on an authoritative user structure, granting permissions to user resources, such as files, contact information, personal information, network shares, and the like. User sharing data 1510 includes user information made available by the user for sharing within the enterprise, and can be used in conjunction with sharing applications 608 to grant users 620 and 630 access such data 1510.

Figure 16:
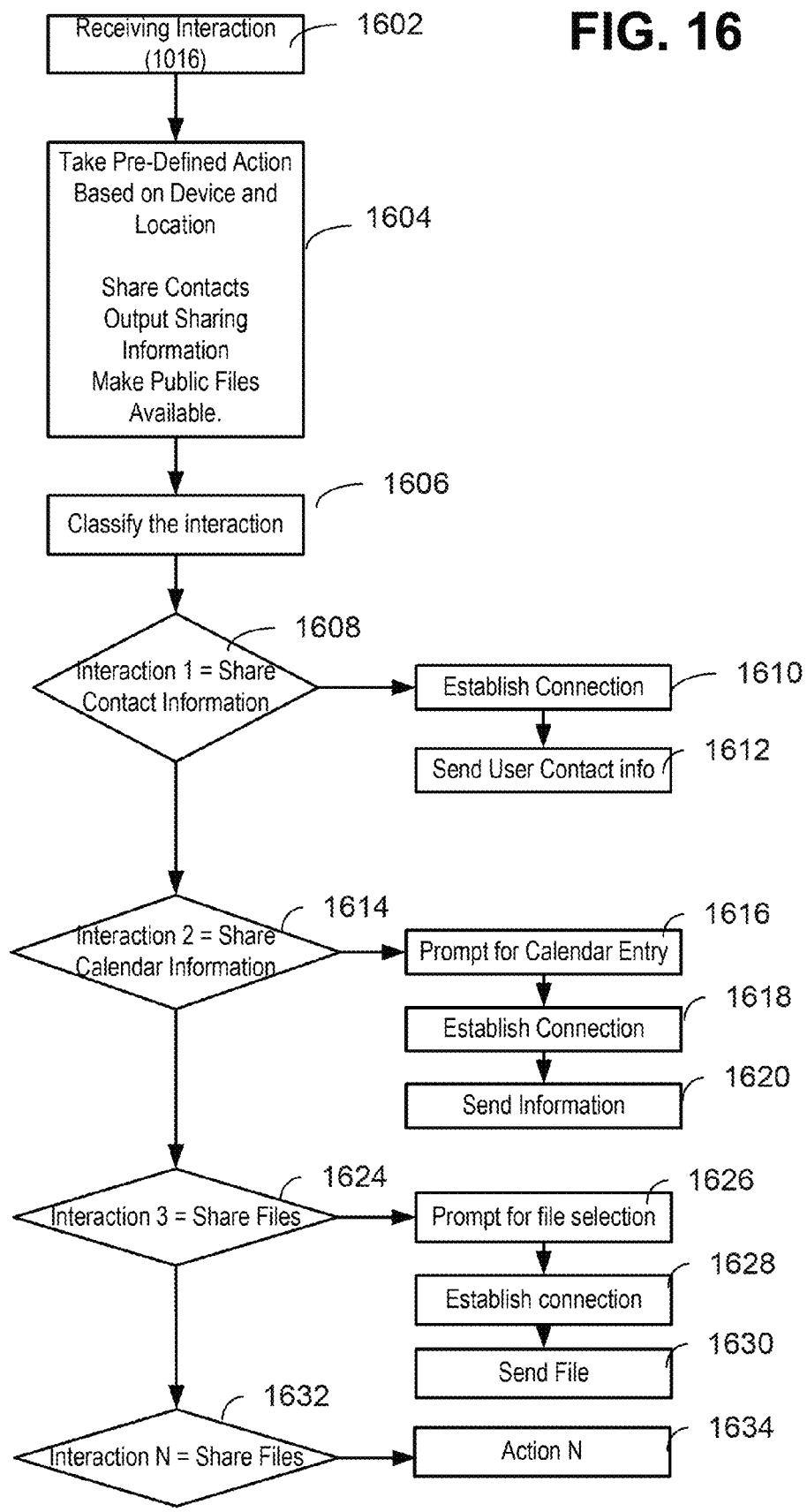
FIG. 16 is a flowchart illustrating exemplary functions of a connection application on a client device such as a mobile device or phone.

FIG. 16 illustrates a process which may occur in a connection application, such as application 632A occurring on a mobile device. At 1602, the application will receive a notification at 1602 that an interaction with its skeletal model has occurred. Optionally, at 1604, a predefined action based on the interaction may occur. In one embodiment, a predefined action may be one which occurs automatically once a connection between two users is established without regard to the type of interaction which occurred. In the case of a mobile phone, the predefined action may be one of sharing personal contact information with another user, outputting sharing information on directories available for sharing on the phone to the other user, or making public files stored on the phone or in other locations, available. The predefined action in 1604 may occur whenever a user interacts with any other skeleton in any manner.

Alternatively, or in addition to the predefined action, at 1606, the application will classify the interaction based on skeletal data and/or audio data associated received. Once classified, the interaction 1608, 1614, 1624, 1632 will result in an action by the application. Each interaction detected at 1606 may comprise one or more commands to perform a type of information sharing which is available to the phone. If the data indicates a first interaction at 1608, the first interaction may signify a command to share contact information with the user. This may involve shaking hands with another person in the room, and detecting that the two skeletal models of the respective users have shaken hands. Alternatively, the interaction may comprise shaking hands with an audio command such as "share contact information". If the interaction is detected at step 1608, then a connection will be established at 1610, and user contact information defined for the user of the application executing in FIG. 16 will be forwarded via the connection to the second user at 1612. If a second interaction or alternative interaction is detected at 1614, the interaction may signify sharing calendar information or a particular calendar entry. If the second interaction is detected at 1614, the user may be prompted to specify a calendar entry at 1616, (or alternatively may share an entire calendar data) a connection will be established at 1618, and the information selected or defined will be sent to the second user's device at 1620. Alternatively, a third interaction may comprise sharing files at 1624 and if the third interaction is detected based on the gesture and/or audio data at 1606, the user may be prompted to select a file or directory for sharing, a connection may be established at 1628, and files transferred at 1630 to the secondary device. Any number of different types of interactions 1632 may be provided with any number of different resulting actions 1634 similar to 1608, 1614, or 1624.

Figure 17:
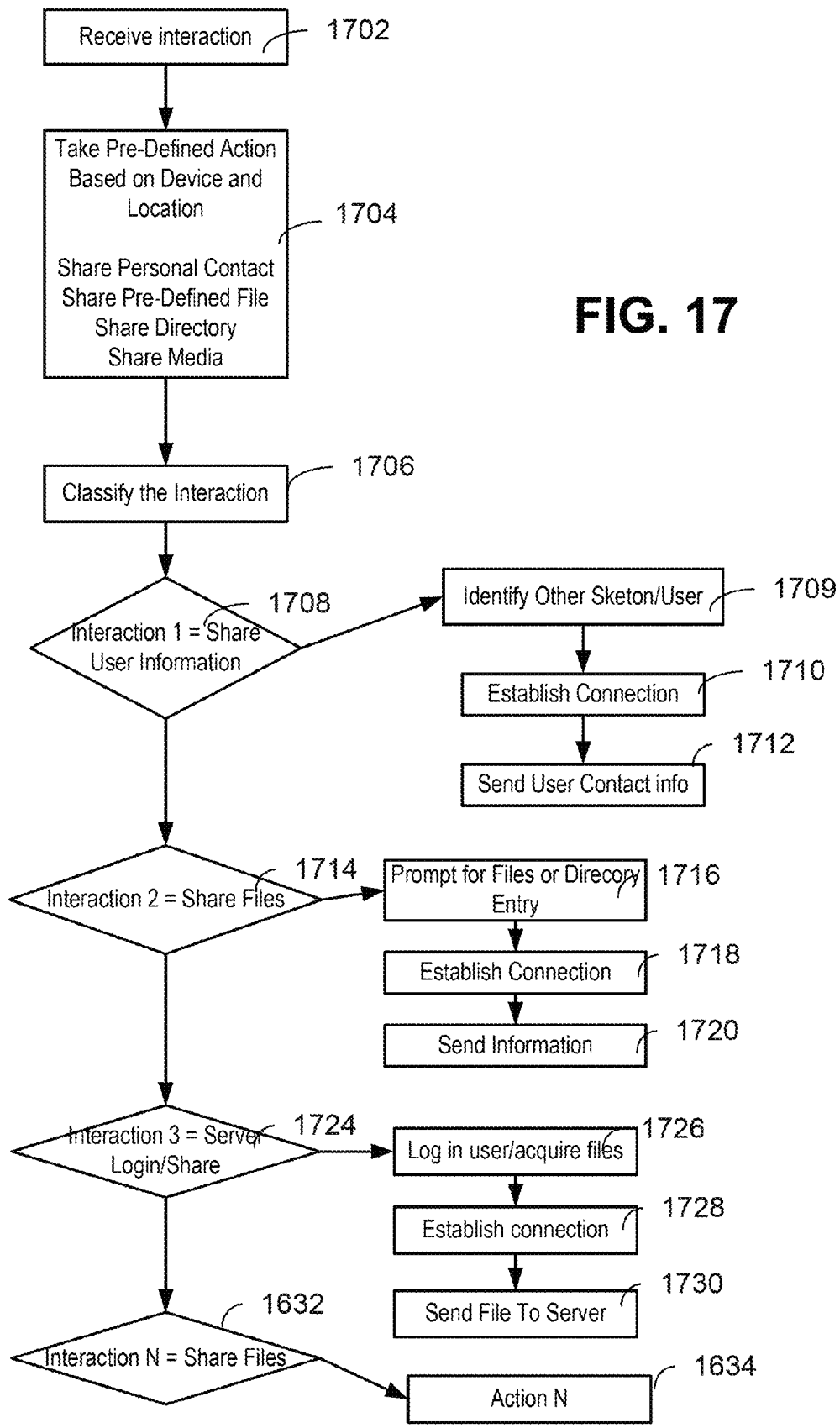
FIG. 17 is a flowchart illustrating exemplary functions of a connection application on a client device such as a mobile computer.

FIG. 17 illustrates a similar process for an application executing on a notebook, such as application 1630. Upon receiving a notification at 1702, optionally, at 1704, the application may take a predefined action based on the device type and the device location. Such predefined actions may be to share personal contact information, share a predefined file, share a directory, or share a particular media. In one example, a connection server may be mounted on a notebook in a room where users are giving a presentation. In this example, when a user enters a predefined location, based on the skeletal model and the user's identity, a predefined action may be to present a file, such as a presentation, existing on the user's processing device, and project the shared file to a larger presentation system, such as a projector for viewing by an audience. In addition, in this example, the user's presentation may be available for sharing to the other user in the room to allow viewers of the presentation to download a copy of the presentation as the user is presenting the presentation. Alternatively, or in addition to the predefined action at 1704, gestures will be classified at 1706. In a manner similar to that defined with respect to FIG. 16, different interactions at 1708, 1714 and 1724 result in different actions by a connection application 630.

A first type of interaction at 1708 may be one which is classified to result in sharing user information. Once the secondary user is identified at 1709, a connection is established at 1710, and user contact information is shared with the second user at 1712. A second type of interaction 1714 may indicate a command to share files. If interaction 2 is determined, then the user may be prompted for files or a directory entry to be shared at 716, a connection established at 1718, and information sent at 1720. Another example of interaction at 1724 may result in a server or enterprise log-in and sharing command at 1724. User credentials may be stored by the connection application so that a user does not have to enter a user identifier or password. The user log-in can be stored by the connection application or other secure storage means within a processing device. Once the enterprise log-in has been achieved, at 726 a prompt for file selection may be made to allow the user to select one or more files or directories for sharing. Alternatively, an automatic share may be created. The location of the files may be on the client device itself, or a shared storage location as discussed above with respect to FIG. 15. Connection may be established to the enterprise server at 1728, or alternatively no connection may be made, with the second device with which information is to be shared making its own connection directly to the shared storage location. If the file needs to be transmitted to the shared location, the file can be transmitted at 1730.

Figure 18:
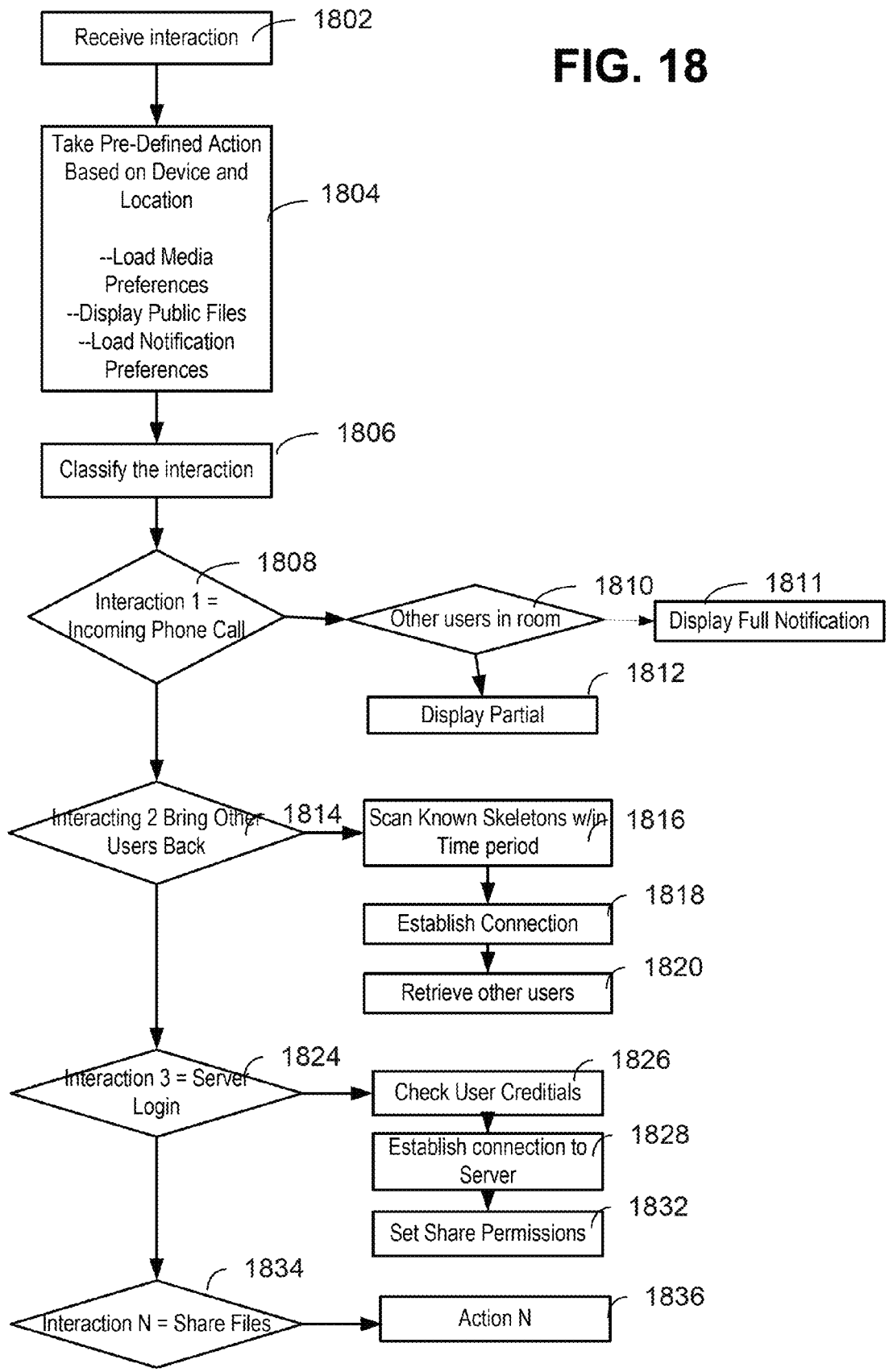
FIG. 18 is a flowchart illustrating exemplary functions of a connection application on a recognition server.

FIG. 18 illustrates a process which may occur by a sharing services application 608 on a connection server which handles connections and actions for clients. In a server based sharing application, interaction detection may be performed by the server. As with the client based applications, the server may take a predefined action based on the location of the skeleton and the device associated with the skeleton at 1804. Such action may include loading media preferences, displaying public files, and loading notification preferences. In one example where a server based connection application may be utilized is in, for example, a shared media environment such as a family living room. In this example, the connection application can be utilized to determine which users having connection clients are positioned in front of a media center wherein the connection server is provided on the console and the camera is provided on a display device such as that illustrated in FIG. 1. When the first user enters the room with a client application such as application 630A on a mobile phone, the system can determine that the user is, for example, a parent in the household and load that user's channel preferences, rating preferences and limitations, and other information specific to that user for presentation via the display device. Likewise when the second user enters the room, such as a child, additional rating systems or rating locks may be added to the effect. Instant messaging and other communication protocols may be routed through the processing devices illustrated above with respect to FIGS. 1 through 4. As such, when interaction data is received at 1802, the action is classified at 1806. One such interaction may be an incoming phone call or incoming instant message at 1808. Depending on whether there are other users in the room at 1810, the connection application 608 may display a full identification for caller and identification at 1811, or only a partial identification at 1812. Likewise, as noted above, as users enter and exit a particular field of view 660, the information on which users were in the particular field of view at any particular time may be maintained for a fixed time period after the user exits the room. For example, where a family is all present in front of a capture device 20 at one particular time, but users exit the room, one interaction by a user in the room may be to indicate that the user wishes all the other users who were in the room within the last five or ten minutes to return. When this interaction is determined at 1814, a determination is made at 1816 as to which users were in the field of data 660 within the previous time period, a connection established to those users' processing devices, and a notification sent to those processing devices to retrieve the others users to the field of view 660. A still further implementation may request log-in to an enterprise or home server at 1824. At 1826 the user's credentials to the server are checked, and a connection established to the server at 1828. Share permissions can be set at 1832. Any number of different interactions 1834 can be defined in this manner based on the interactive data defined at 1806.

The technology disclosed herein may serve as a platform on which other technologies can be utilized. The connection server 600 illustrated above, allows various different methods of connection between the processing devices which connect to the sever and associated skeleton data identifying users based on their movements. Interactions can be defined as particular gestures, or gestures combined with audio commands, or audio commands alone. In a unique aspect of the technology, information is provided to the various connection applications from a single perspective. That is, the capture device 20 gives a single perspective view of the entire field of view 660. Because a single field of view and single perspective is utilized, movements of interaction and relationships amongst the various users in the room can be maintained.

The foregoing detailed description has been presented for purposes of illustration and description. It is not intended to be exhaustive or to limit the technology disclosed to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. Moreover, it should be noted that the language used in the specification has been principally selected for readability and instructional purposes. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method for sharing information between users, comprising:
   monitoring a scene using a capture device including a processor having a field of view including the scene;
   detecting a first user in the scene using the capture device and creating a skeletal model for the first user;
   associating the first user in the scene with a first user processing device;
   tracking movements of the first user in a scene using the skeletal model of the first user;
   detecting a second user in the scene using the capture device and creating a skeletal model for the second user;
   associating the second user in the scene with a second user processing device;
   tracking movements of the second user in a scene using the skeletal model of the second user;
   providing skeletal data identifying the first user and the second user to an information sharing application;
   detecting interactions between skeletal models of the first user and the second user to the information sharing application; and
   responsive to detecting an interaction, sharing information stored in the first processing device with the second processing device.

2. The computer implemented method of claim 1 wherein detecting includes detecting depth information for each user and recognition information for each user.

3. The computer implemented method of claim 1 wherein the method is performed by a server having coupled thereto the capture device.

4. The computer implemented method of claim 3 wherein the information sharing application is provided on the first user processing device.

5. The computer implemented method of claim 3 wherein the information sharing application is provided on the server.

6. The computer implemented method of claim 1 further including:
   transferring user information stored on the first user processing device to the second user processing device responsive to the detecting.

7. The computer implemented method of claim 6 wherein detecting the interaction includes detecting a sound associated with the relationship between the first user and the second user temporally related to the relationship.

8. The computer implemented method of claim 1 wherein the method further includes providing tracking information for the skeletal model of the first user and the skeletal model of the second user to at least the first user processing device.

9. The computer implemented method of claim 1 wherein associating includes:
   receiving a request from the first processing device for an identification of an unknown user in the scene;
   providing skeletal data and recognition information associated with a skeletal model of the unknown to the processing device responsive to the request;
   receiving a request for ownership of the skeletal model of the unknown user; and
   linking the processing device and the skeletal model of the unknown user.

10. A method for sharing information between at least two users, each user having a processing device, comprising:
   detecting a detection and tracking server proximate to a scene, the server coupled to a capture device having a view of the scene including each of the users, the detection and tracking server creating a skeletal model of each of the users in the scene;
   associating a first of the at least two users with a first user processing device by requesting a first skeletal model identifying the first of the at least two users in the scene;
   associating a second of the at least two users with a second user processing device by requesting a second skeletal model identifying the second of the at least two users in the scene;
   determining a physical interaction between the at least two users based on an interaction between the first skeletal model with the second skeletal model in the scene via the capture device; and
   responsive to the interaction determining a predefined sharing action and sharing user information stored on the first user processing device and the second user processing device based on the interaction and the predefined action.

11. The method of claim 10 wherein associating includes receiving skeletal model tracking information for each of the users in the scene and wherein the tracking information comprises image data associated with each of the skeletal models, and matching the image data with known image data for a user.

12. The method of claim 11 wherein associating further includes requesting ownership of a skeletal model, and wherein determining a physical interaction includes:
receiving tracking information on skeletal models of each of the users in the scene;
detecting an interaction between the users comprising one of: a gesture indicating a relationship between the users, a proximal interaction between two skeletal models, a proximal interaction between two skeletal models accompanied by a sound, or an audible command.

13. The method of claim 12 wherein the method further includes associating one of a predefined sharing action or a sharing action defined by a type of interaction detected.

14. The method of claim 13 wherein sharing information includes creating a connection between the first processing device associated with the first user and a second processing device associated with the second user.

15. A computer storage device including instructions causing a computer to perform a process, the process comprising:
monitoring a scene using depth and recognition information provided by a capture device having an associated processor, the scene within the field of view of the capture device;
tracking movements of targets comprising at least a first user and a second user in a scene using a skeletal model for each target in the scene;
associating a first user in the scene with a first skeletal model and a first user processing device;
associating a second user in the scene with a second skeletal model and a second user processing device;
detecting interactions between the first user and the second user in the scene by reference to movements of the first and second skeletal models of the users; and
upon detecting an interaction, sharing information stored on the the first user processing device with the second user processing device by transferring the information from the first user device to the second user device.

16. The computer storage device of claim 15 wherein monitoring is performed by a first computer and tracking movements is performed by the first user processing device associated with the first user.

17. The computer storage device of claim 15 wherein sharing information between users comprises executing a predefined action.

18. The computer storage device of claim 17 wherein executing a predefined action includes sharing user contact information automatically upon detecting the interaction.

19. The computer storage device of claim 15 wherein the interaction comprises detecting a relationship between a first skeletal model and a second skeletal model.

20. The computer storage device of claim 15 wherein associating includes:
receiving a request from the first user processing device for an identification of a new user in the scene;
providing skeletal data and recognition information associated with the skeletal model to the first user processing device responsive to the request;
receiving a request for ownership of the skeletal model; and
linking the processing device and the skeletal model.

* * * * *